US012698819B2

(12) United States Patent
Walkingshaw et al.

(10) Patent No.: US 12,698,819 B2
(45) Date of Patent: Aug. 4, 2026

(54) FLYWHEEL MAGNETIC LIFT AND BEARING SYSTEM

(71) Applicant: Torus Inc., Sandy, UT (US)

(72) Inventors: Nathan Walkingshaw, Sandy, UT (US); Calab Nelson, Springville, UT (US); John Loveless, Layton, UT (US); Zahra Derafshi, Cambridge, MA (US); Cliff Lambarth, Portage, MI (US); Sean Peterson, Payson, UT (US)

(73) Assignee: Torus Inc., South Salt Lake, UT (US)

( * ) Notice: Subject to any disclaimer, the term of this patent is extended or adjusted under 35 U.S.C. 154(b) by 0 days.

(21) Appl. No.: 18/666,573

(22) Filed: May 16, 2024

(65) Prior Publication Data

US 2024/0388165 A1     Nov. 21, 2024

Related U.S. Application Data

(60) Provisional application No. 63/502,648, filed on May 16, 2023.

(51) Int. Cl.
F16F 15/315     (2006.01)
F03G 3/08     (2006.01)
(Continued)

(52) U.S. Cl.
CPC ............ F16F 15/3156 (2013.01); F03G 3/08 (2013.01); F16C 17/02 (2013.01);
(Continued)

(58) Field of Classification Search
None
See application file for complete search history.

(56) References Cited

U.S. PATENT DOCUMENTS 3,970,917 A     7/1976  Diggs
4,186,245 A     1/1980  Gilman
(Continued)

FOREIGN PATENT DOCUMENTS

CN     217676608 U     10/2022
CN     115626413 A     1/2023
(Continued)

OTHER PUBLICATIONS

"The energy transition demands more than renewables and battery-based energy storage," Amber Kinetics—Take Charge, retrieve from https://amberkinetics.com/, retrieved on Feb. 25, 2023, pp. 5.
(Continued)

*Primary Examiner* — Vicky A Johnson
(74) *Attorney, Agent, or Firm* — VLP Law Group, LLP; Michel Bohn; Lance Topham

(57)     ABSTRACT

A system may include a massive flywheel including a rotatable mass component and one or more axles coupled with the rotatable mass component. A system may include a magnetic lift component having one or more magnets positioned around a center perforation, the one or more axles passing through the center perforation in the magnetic lift component, the one or more magnets pulling the massive flywheel toward the magnetic lift component. A system may include a support structure coupled with the magnetic lift component, the support structure holding the magnetic lift component at a stationary location relative to the support structure. A system may include one or more bearings coupled with the support structure and the one or more axles to maintain the one or more axles at an axis of rotation.

18 Claims, 26 Drawing Sheets

(51) Int. Cl.
  *F16C 17/02*     (2006.01)
  *H02K 7/09*     (2006.01)
  *H02K 7/02*     (2006.01)
(52) U.S. Cl.
  CPC ........... *F16F 15/3153* (2013.01); *H02K 7/09*
    (2013.01); *F05B 2230/608* (2013.01); *F05B*
    *2240/40* (2013.01); *F05B 2260/421* (2013.01);
    *F16C 2361/55* (2013.01); *H02K 7/025*
    (2013.01)

(56) References Cited

U.S. PATENT DOCUMENTS

| | | | |
|---|---|---|---|
| 4,244,240 A | 1/1981 | Rabenhorst | |
| 4,538,079 A * | 8/1985 | Nakayama | H02K 7/025 |
| | | | 310/74 |
| 5,124,605 A | 6/1992 | Bitterly et al. | |
| 5,726,516 A | 3/1998 | Randall | |
| 5,783,885 A | 7/1998 | Post | |
| 6,029,538 A | 2/2000 | Little et al. | |
| 6,614,142 B1 | 9/2003 | Bonnieman et al. | |
| 6,679,634 B2 | 1/2004 | Plesh, Sr. | |
| 7,977,837 B2 | 7/2011 | Oyama | |
| 9,325,217 B2 * | 4/2016 | Veltri | H02K 7/09 |
| 11,362,558 B2 | 6/2022 | Sanders et al. | |
| 11,824,355 B2 | 11/2023 | Walkingshaw et al. | |
| D1,051,117 S | 11/2024 | Hennessey | |
| 12,292,096 B2 | 5/2025 | Walkingshaw et al. | |
| 2003/0029269 A1 | 2/2003 | Gabrys | |
| 2004/0051507 A1 | 3/2004 | Gabrys et al. | |
| 2011/0031827 A1 | 2/2011 | Gennesseaux | |
| 2012/0062154 A1 | 3/2012 | Chiao et al. | |
| 2012/0176074 A1 | 7/2012 | Dubois et al. | |
| 2013/0015825 A1 * | 1/2013 | Pullen | H02K 7/025 |
| | | | 310/156.04 |
| 2013/0261001 A1 | 10/2013 | Hull et al. | |
| 2014/0165777 A1 | 6/2014 | Andrews et al. | |
| 2014/0346780 A1 | 11/2014 | Holder | |
| 2014/0366683 A1 | 12/2014 | Pullen | |
| 2016/0178031 A1 * | 6/2016 | Pullen | F16F 15/30 |
| | | | 74/572.11 |
| 2016/0241106 A1 | 8/2016 | Veltri | |
| 2016/0377147 A1 | 12/2016 | Sun et al. | |
| 2020/0112216 A1 | 4/2020 | Galmiche et al. | |
| 2020/0212762 A1 | 7/2020 | Dharan | |
| 2020/0259379 A1 | 8/2020 | Sanders et al. | |
| 2021/0184539 A1 | 6/2021 | Ashley | |
| 2022/0231572 A1 * | 7/2022 | Kesler | H02K 7/1807 |
| 2022/0243784 A1 | 8/2022 | Pullen | |
| 2022/0255382 A1 | 8/2022 | Sanders et al. | |
| 2023/0138936 A1 | 5/2023 | Walker, III et al. | |
| 2023/0246481 A1 | 8/2023 | Walkingshaw et al. | |
| 2024/0088706 A1 | 3/2024 | Walkingshaw et al. | |
| 2024/0384708 A1 | 11/2024 | Walkingshaw et al. | |
| 2024/0384776 A1 | 11/2024 | Walkingshaw et al. | |
| 2024/0384777 A1 | 11/2024 | Walkingshaw et al. | |
| 2024/0388164 A1 | 11/2024 | Walkingshaw et al. | |

FOREIGN PATENT DOCUMENTS

| | | | | |
|---|---|---|---|---|
| GB | 2494783 A | 3/2013 | | |
| IL | 289441 A | 12/2022 | | |
| JP | 2007-056710 A | 3/2007 | | |
| WO | WO-9307387 A1 * | 4/1993 | | F16F 15/30 |
| WO | 2023/126923 A1 | 7/2023 | | |
| WO | 2024/238840 A1 | 11/2024 | | |
| WO | 2024/238842 A1 | 11/2024 | | |
| WO | 2024/238845 A1 | 11/2024 | | |
| WO | 2024/238855 A1 | 11/2024 | | |

OTHER PUBLICATIONS

Amiryar, M. E., et al., "Analysis of Standby Losses and Charging Cycles in Flywheel Energy Storage Systems", Energies, vol. 13, 2020, 22 pages.

Bianchini, C., et al., "Design of Motor/Generator for Flywheel Batteries", IEEE Transactions on Industrial Electronics, vol. 68, No. 1, Oct. 2021, pp. 9675-9684.

Ertz, Gabriel, Development, manufacturing, and testing of a multi-rim {hybrid} flywheel rotor, Diploma Thesis University of Alberta, Institute For Dynamics and Vibration, Jun. 10, 2014, 107 pages.

Ha, Sung K., et al., Design and Manufacture of a Composite Flywheel Press-Fit Multi-Rim Rotor, Journal of Reinforced Plastics and Composites, 27, Feb. 25, 2008, SAGE Publications, pp. 953-965.

Ha, Sung K., et al, Design and Spin Test of Hybrid Composite Flywheel Rotor with Split Type Hub, Journal of Composite Materials, Jan. 9, 2006, SAGE Publications, pp. 1-18.

International Search Report and Written Opinion of Intl. Application No. PCT/US2023/061784, mailed Jun. 5, 2023 (12pages).

Kim, Seong J., et al., Design and fabrication of hybrid composite hub for multi-rim flywheel energy storage system, Composite Structures 107, 2014, pp. 19-29.

Machine translation of JP2007056710; Nakaseki et al. (Year: 2007).

International Preliminary Report on Patentability received for PCT Patent Application No. PCT/US23/61784, mailed on Aug. 15, 2024, 11 pages.

International Search Report and Written Opinion received for PCT Patent Application No. PCT/US2024/029771, mailed on Sep. 23, 2024, 16 pages.

International Search Report and Written Opinion received for PCT Patent Application No. PCT/US24/29773, mailed on Aug. 15, 2024, 12 pages.

International Search Report and Written Opinion received for PCT Patent Application No. PCT/US24/29779, mailed on Aug. 15, 2024, 13 pages.

International Search Report and Written Opinion received for PCT Patent Application No. PCT/US24/29793, mailed on Aug. 8, 2024, 7 pages.

Invitation to Pay Additional Fees received for PCT Patent Application No. PCT/US2024/029771, mailed on Jul. 30, 2024, 2 pages.

GlobalSpec, Flywheel Power Systems Selection Guide: Types, Features, Applications, Flywheel Power Systems Information, 5pp., obtained at https://www.globalspec.com/learnmore/electrical_electronic_components/power_generation_storage/alternative_power_generators/flywheel_power_systems.

Extended European Search Report and Search Opinion received for EP Application No. 23750366.9, mailed on Oct. 13, 2025, 16 pages.

Office Action received for Australian Patent Application No. 2023215462, mailed on Feb. 17, 2025, 4 pages.

International Preliminary Report on Patentability received for PCT application No. PCT/US24/29773, mailed on Nov. 27, 2025, 10 pages.

International Preliminary Report on Patentability received for PCT application No. PCT/US24/29779, mailed on Nov. 27, 2025, 12 pages.

International Preliminary Report on Patentability received for PCT application No. PCT/US24/29793, mailed on Nov. 27, 2025, 7 pages.

International Preliminary Report on Patentability received for PCT Patent Application No. PCT/US24/29771, mailed on Nov. 27, 2025, 13 pages.

Office Action received for Australian Patent Application No. 2024272422, mailed on Dec. 8, 2025, 4 pages.

Office Action received for Australian Patent Application No. 2024274349, mailed on Dec. 3, 2025, 3 pages.

Office Action received for Australian Patent Application No. 2023215462, mailed on Jan. 29, 2026, 3 pages.

Office Action received for Canadian Patent Application No. 3292533, mailed on Jan. 15, 2026, 9 pages.

Amber Kinetics, Inc. (2015). Final Technical Report: Smart Grid Demonstration Program—Flywheel Energy Storage Demonstration. U.S. Department of Energy, Contract ID: DE-OE0000232, Dec. 30, 2015, 16 pages, Version 1.0., https://www.energy.gov/sites/prod/files/2017/01/f34/Amber_Kinetics_Final_Technical_Report.pdf.

(56)          References Cited

OTHER PUBLICATIONS

Groom, N. J., et al., "Fifth International Symposium on Magnetic Suspension Technology", NASA/CP-2000-210291, Jul. 2000, Introduction through the Table of Contents, Session 1 (pp. 1-48), a portion of Session 5 (pp. 239-247), Session 7 (pp. 285-307), Session 9 (pp. 355-381), Session 15 (pp. 593-610), and a portion of Session 17 (pp. 675-720).

* cited by examiner

128

152

208a

434

120a

152

122

504

422

152

434

604

608

FLYWHEEL MAGNETIC LIFT AND BEARING SYSTEM

CROSS-REFERENCE TO RELATED APPLICATION

This application claims priority to U.S. Provisional Patent Application No. 63/502,648 filed on May 16, 2023. The present application is related to co-pending U.S. application Ser. No. 18/666,522, titled "Mechanical-Energy Storage Unit System" filed on May 16, 2024; U.S. application Ser. No. 18/666,542, titled "Flywheel Vacuum Enclosure and Adjustment System" filed on May 16, 2024; U.S. application Ser. No. 18/666,557, titled "Stacking Flywheel and Linkage" filed on May 16, 2024; and U.S. application Ser. No. 18/666,593, titled "Mechanical-Energy Storage Unit and Assembly Fixture" filed on May 16, 2024; as the present application by common inventors. All of these applications are incorporated herein by reference, including their specifications and drawings, which disclosure is not admitted to be prior art with respect to the present invention by its mention in the cross-reference section.

BACKGROUND

The present disclosure relates to mechanical energy storage units. Implementations relate to flywheel-based mechanical energy storage units.

Currently, residential electricity customers, as well as electrical utilities, use various sources of electrical energy storage to offset varying electrical power production and use, such as the duck curve associated with solar or other renewable energy production. The variation in power production and usage has been further exacerbated with the increasing popularity of renewable power sources. These issues cause significant cost and other issues to utilities, power outages, and other issues.

Commonly, excess or backup power is stored in chemical storage, such as large chemical batteries. Unfortunately, chemical batteries suffer from many issues that make them undesirable at both a residential level and at a utility level. For example, chemical batteries may be very expensive, complex, and require numerous safeguards against fires. Chemical batteries are also ecologically unfriendly, as their production uses toxic chemicals, creates significant greenhouse gases, and results in significant material waste. Furthermore, chemical batteries have short lifespans because the batteries have a limited number of years and recharge cycles before they must be disposed of.

Previous solutions for mechanical energy storage have been overly complex, too large to be implemented at a residential level, not scalable for an electrical utility, or have faced other issues.

SUMMARY

In some aspects, the techniques described herein relate to a system including: a massive flywheel including a rotatable mass component and one or more axles coupled with the rotatable mass component; a magnetic lift component having one or more magnets positioned around a center perforation, the one or more axles passing through the center perforation in the magnetic lift component, the one or more magnets pulling the massive flywheel toward the magnetic lift component; a support structure coupled with the magnetic lift component, the support structure holding the magnetic lift component at a stationary location relative to the support structure; and one or more bearings coupled with the support structure and the one or more axles to maintain the one or more axles at an axis of rotation.

In some aspects, the techniques described herein relate to a system, wherein the rotatable mass component includes: a top plate with a flat top surface, the top plate rotating about the axis of rotation, the flat top surface positioned adjacent to the one or more magnets of the magnetic lift component, the top plate being attracted to the one or more magnets to reduce a downward force of the massive flywheel on the one or more bearings.

In some aspects, the techniques described herein relate to a system, wherein the rotatable mass component includes: the top plate; multiple massive plates stacked together; and a bottom plate, the multiple massive plates being located between the top plate and the bottom plate.

In some aspects, the techniques described herein relate to a system, wherein: the top plate and the bottom plate are coupled together using a plurality of fasteners, the top plate and the bottom plate applying a compressive force on the multiple massive plates.

In some aspects, the techniques described herein relate to a system, wherein the one or more axles at the axis of rotation include a top axle and a bottom axle, the top axle being separate from the bottom axle, the top axle passing through the center perforation of the magnetic lift component.

In some aspects, the techniques described herein relate to a system, wherein the one or more bearings include: one or more top bearings and one or more bottom bearings, the one or more top bearings interacting with a top of the massive flywheel at the one or more axles, and the one or more bottom bearings interacting with a bottom of the rotatable mass component at the one or more axles.

In some aspects, the techniques described herein relate to a system, wherein the one or more magnets are configured to pull the massive flywheel with a force greater than a weight of the massive flywheel.

In some aspects, the techniques described herein relate to a system, further including: one or more seals that form an airtight seal between an inside and an outside of a flywheel enclosure, the support structure including the flywheel enclosure, the massive flywheel being located inside the flywheel enclosure.

In some aspects, the techniques described herein relate to a system, wherein: the support structure includes a lid, the rotatable mass component being located inside the support structure; the one or more magnets are coupled to a bottom side of the lid; and the one or more magnets are located inside the support structure.

In some aspects, the techniques described herein relate to a system, wherein: the support structure includes an enclosure that is sealed; a vacuum assembly is coupled to the lid to establish an internal vacuum; and the one or more magnets are located inside the internal vacuum.

In some aspects, the techniques described herein relate to a system, wherein the magnetic lift component includes: a backer ring coupled to the support structure; the one or more magnets disposed on the backer ring; and a magnet holder enclosing the one or more magnets and coupled with the backer ring.

In some aspects, the techniques described herein relate to a system, further including: a magnetic coupling having a first rotor and a second rotor, the first rotor including a first set of magnets, the second rotor including a second set of magnets, the first set of magnets and the second set of magnets interacting to rotationally couple the first rotor to the second rotor.

In some aspects, the techniques described herein relate to a system, further including: wherein the first rotor is located inside at least a portion of the second rotor, the first rotor being coupled with the one or more axles and the second rotor being coupled with an electric motor.

In some aspects, the techniques described herein relate to a mechanical-energy storage unit including: a massive flywheel including a rotatable mass component and one or more axles coupled with the rotatable mass component, the rotatable mass component including: a top clamping plate; multiple massive plates; a bottom clamping plate, the multiple massive plates being located between the top clamping plate and the bottom clamping plate; and a plurality of fasteners coupling the top clamping plate with the bottom clamping plate and applying a compressive force on the multiple massive plates; a magnetic lift component having one or more magnets positioned around a center perforation, the one or more axles passing through the center perforation in the magnetic lift component, the one or more magnets pulling the massive flywheel toward the magnetic lift component, the top clamping plate being positioned adjacent to the one or more magnets of the magnetic lift component; a support structure coupled with the magnetic lift component, the support structure holding the magnetic lift component at a stationary location relative to the support structure; and one or more bearings coupled with the support structure and the one or more axles to maintain the one or more axles at an axis of rotation, the top clamping plate being attracted to the one or more magnets to reduce a downward force of the massive flywheel on the one or more bearings.

In some aspects, the techniques described herein relate to a mechanical-energy storage unit, wherein the one or more magnets are configured to pull the massive flywheel with a force greater than a weight of the massive flywheel.

In some aspects, the techniques described herein relate to a mechanical-energy storage unit, wherein: the support structure includes a lid, the rotatable mass component being located inside the support structure; and the magnetic lift component is coupled to the lid.

In some aspects, the techniques described herein relate to a mechanical-energy storage unit, wherein the magnetic lift component includes: a backer ring coupled to the support structure; the one or more magnets disposed on the backer ring; and a magnet holder enclosing the one or more magnets and coupled with the backer ring.

In some aspects, the techniques described herein relate to an assembly for a flywheel including: a magnetic lift component having one or more magnets positioned around a center perforation, one or more axles of a flywheel passing through the center perforation in the magnetic lift component, the one or more magnets pulling the flywheel toward the magnetic lift component, the magnetic lift component being held by a support structure, wherein the magnetic lift component includes: a backer ring coupled to the support structure; the one or more magnets disposed on the backer ring; and a magnet holder coupled with the backer ring and providing support to the one or more magnets.

In some aspects, the techniques described herein relate to an assembly, wherein the one or more magnets are configured to pull the flywheel with a force greater than a weight of the flywheel.

In some aspects, the techniques described herein relate to an assembly, wherein: the support structure includes an enclosure with a lid, the flywheel being located inside the enclosure; the one or more magnets are coupled to a bottom side of the lid; and the one or more magnets are located inside the enclosure.

Other implementations of one or more of these aspects or other aspects include corresponding systems, apparatus, and computer programs, configured to perform the various actions and/or store various data described in association with these aspects. These and other implementations, such as various data structures for controlling the mechanical energy storage unit, may be encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1A:
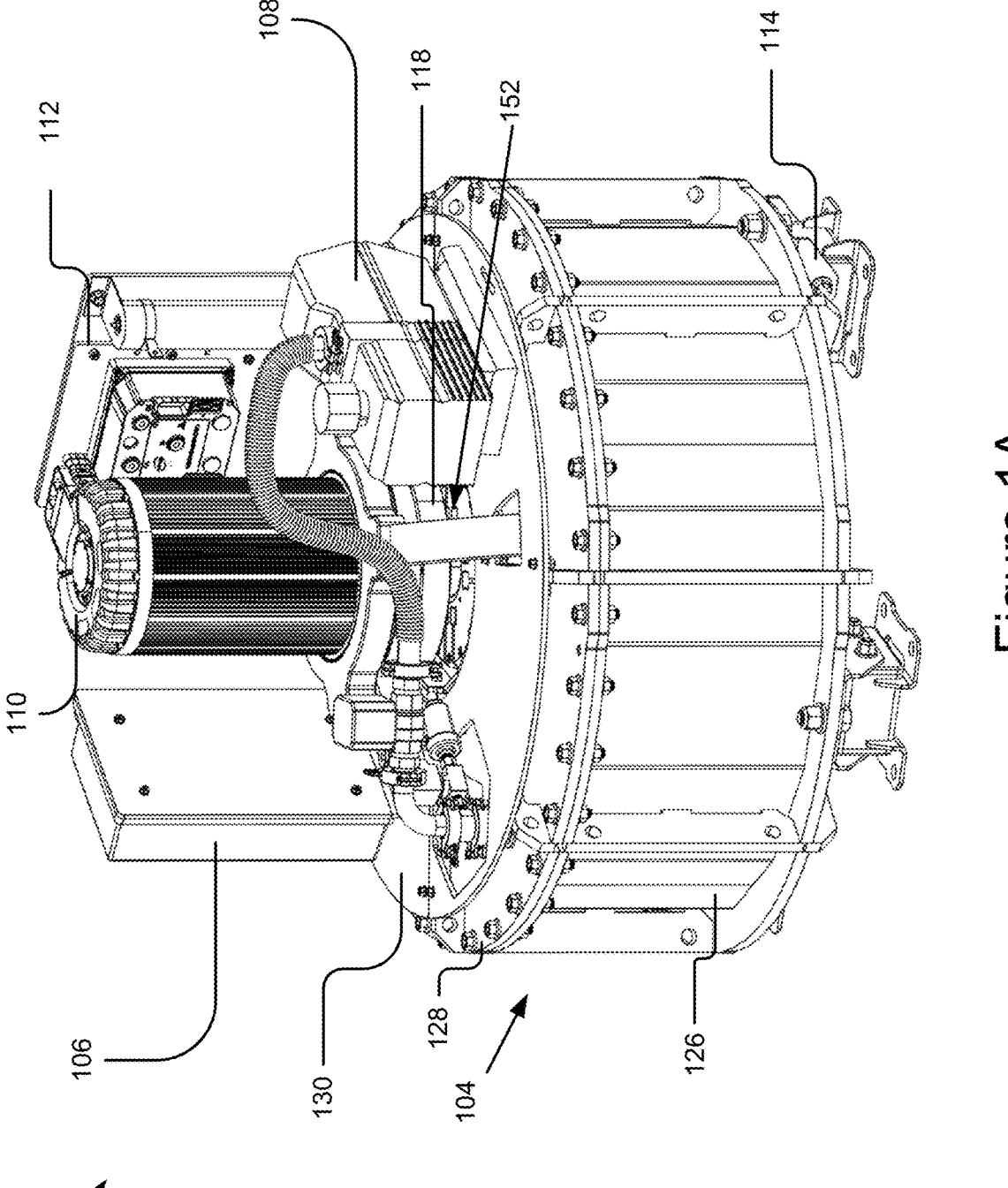
FIG. 1A illustrates an example mechanical-energy storage unit or flywheel assembly.

This description includes several improvements over previous solutions, such as those described in reference to the Background. A mechanical-energy storage unit is described herein along with its assembly and an assembly fixture. Some aspects of the technology include components that reduce vertical force by a massive flywheel on bearings, such as an improved magnetic lift system. Other aspects include bearings, magnetic couplings, clamping plates, and/or other systems that may further improve the mechanical energy storage unit.

In some implementations, one or two mechanical-energy storage units 102 may be installed at a residence to provide backup power in case of a power outage, to store electricity generated using residential solar panels, or to offset unevenness of power production and usage (e.g., an electrical utility may control the mechanical-energy storage unit 102 at a residence to address the balance energy use/production at the residence, nearby residences, or across the power grid). A mechanical-energy storage unit 102 may be buried next to an electrical panel or placed in a shed outside a residence, placed in a garage or utility room, or stored offsite.

In some implementations, multiple mechanical-energy storage units 102 may be coupled together to scale energy backup at a larger facility, such as a business, or by an electrical utility. For instance, many mechanical-energy storage units 102 may be placed at a facility, buried, or otherwise used by an electrical utility. The multiple mechanical-energy storage units 102 may be communicatively linked to each other or to a central server to control storage and distribution of the stored energy (e.g., by controlling the rotational frequency of a flywheel 202 to keep various flywheels 202 at efficient speeds).

Various implementations and features of flywheel energy storage systems (FESS) are described herein. These provide improvements over previous energy storage units including other flywheels 202. For instance, the technology described herein provides an improved flywheel system or assembly, improved bearings, improved flywheel-motor couplings, improved flywheel housing, improved flywheel plates, improved assembly fixture, and method for assembly and use, among other improvements, features, and benefits.

For example, a flywheel 202 may include a rotatable mass component, which may comprise a plurality of stacking plates 122, cylinders, or other components, one or more bolt or clamping plates 120, one or more axle 208 members, and other features. For instance, the technologies described herein include a plurality of plates that may have contoured edges based on an associated support structure, which allows increased speeds while reducing failure modes. For instance, the support structure may include clamping plates 120 that apply pressure to stacking plates 122, thereby inducing friction between the plates to keep them in place and transfer rotational momentum between the plates and one or more axles 208. In some implementations, two clamping plates 120 may be clamped together by bolts or other fasteners, which thereby cause the clamping plates 120 to apply pressure on massive plates (e.g., in an axial direction), which may be referred to herein as stacking plates 122, and increase the friction among the stacking plates 122, which may, in some cases, allow the stacking plates 122 to be used without other fasteners, thereby improving safety and efficiency. Other features and benefits of the flywheel 202 are described below. Not only are the plates improved, but their support structure is improved, among other benefits. Further implementations and features allow the expansion, positioning, and use of the flywheel 202 thereby further improving its performance.

Among other improvements, the technologies described herein also include an improved support structure, such as an enclosure 104, and support system, which may include, among other things, a sealed enclosure 104, a lid-mounted vacuum assembly 108, a magnetic coupling 118, various bearings, and positioning mechanisms. The enclosure 104 may include a magnetic lift assist mechanism 152 that either entirely supports or partially supports the weight of the flywheel 202 (e.g., to reduce wear on bearings). The enclosure 104 may also include a transport surface and a lifting and adjustment mechanism that moves the position of the flywheel 202 internal to the enclosure 104 from a transport or storage position and adjusts it in an active position. The enclosure 104 may provide support for various components, such as a supercapacitor 106, vacuum assembly, processor/controller/central processing unit, a motor 110, and other components. The enclosure 104 may include various features for maintaining a vacuum, holding one or more bearings, positioning a flywheel 202 during use or transport, mitigating damage due to structural failures, and isolating vibration, among other features.

Other benefits and features are described throughout this disclosure, but it should be noted that other features and benefits are contemplated. Furthermore, while various implementations are described in reference to the figures, these are provided by way of example and their features may be expanded, modified, or removed. For instance, features described in reference to some implementations may additionally or be used with other implementations.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components. Further, it should be noted that while various example features and implementations are described throughout this disclosure and the figures, these examples are not exhaustive of every contemplated implementation, feature or permutation. For instance, while a certain feature may be described in reference to a first implementation, the feature may be used with a second implementation or the features, operations, etc., may otherwise be exchanged between the implementations.

The innovative technology disclosed in this document also provides novel advantages including the ability to integrate modem technology with conventional power infrastructure; enable rapid transition to renewable energy sources; use the power grid as a backup; store power locally in nodes and regionalized storage clusters of nodes; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

Figure 1B:
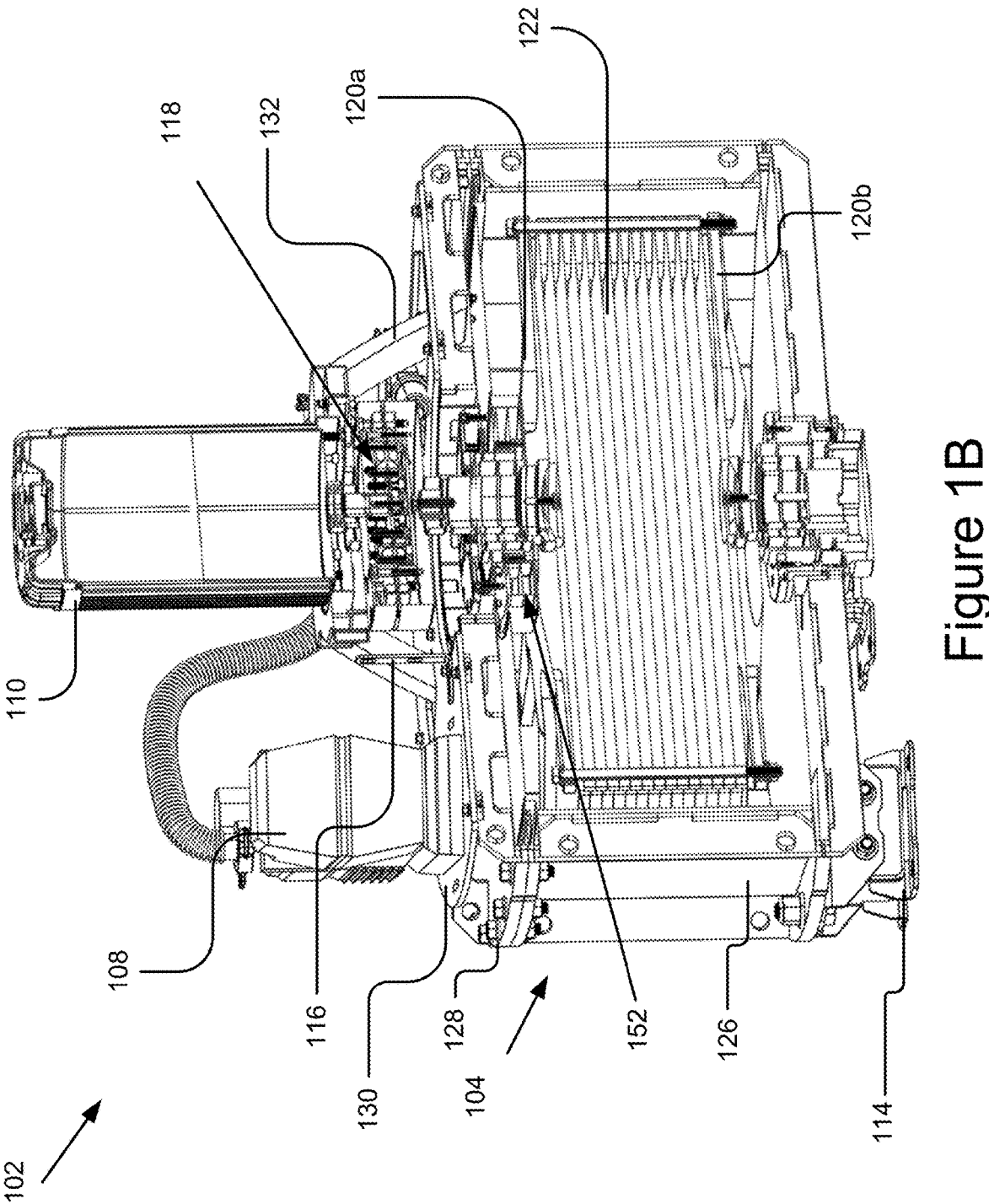
FIG. 1B illustrates an example cross section view of a flywheel assembly.
Figure 1C:
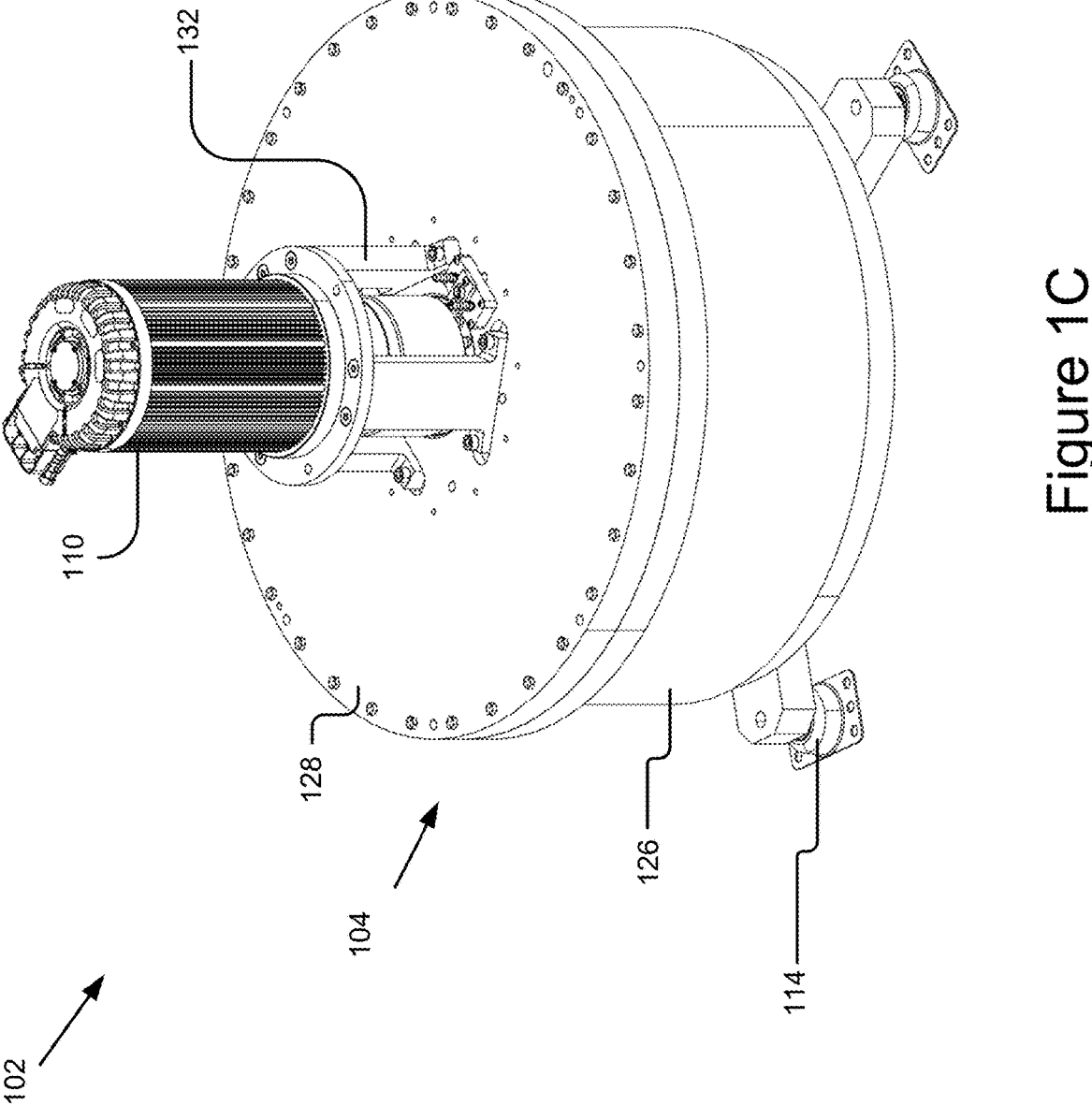
FIG. 1C illustrates an example flywheel assembly.
Figure 1D:
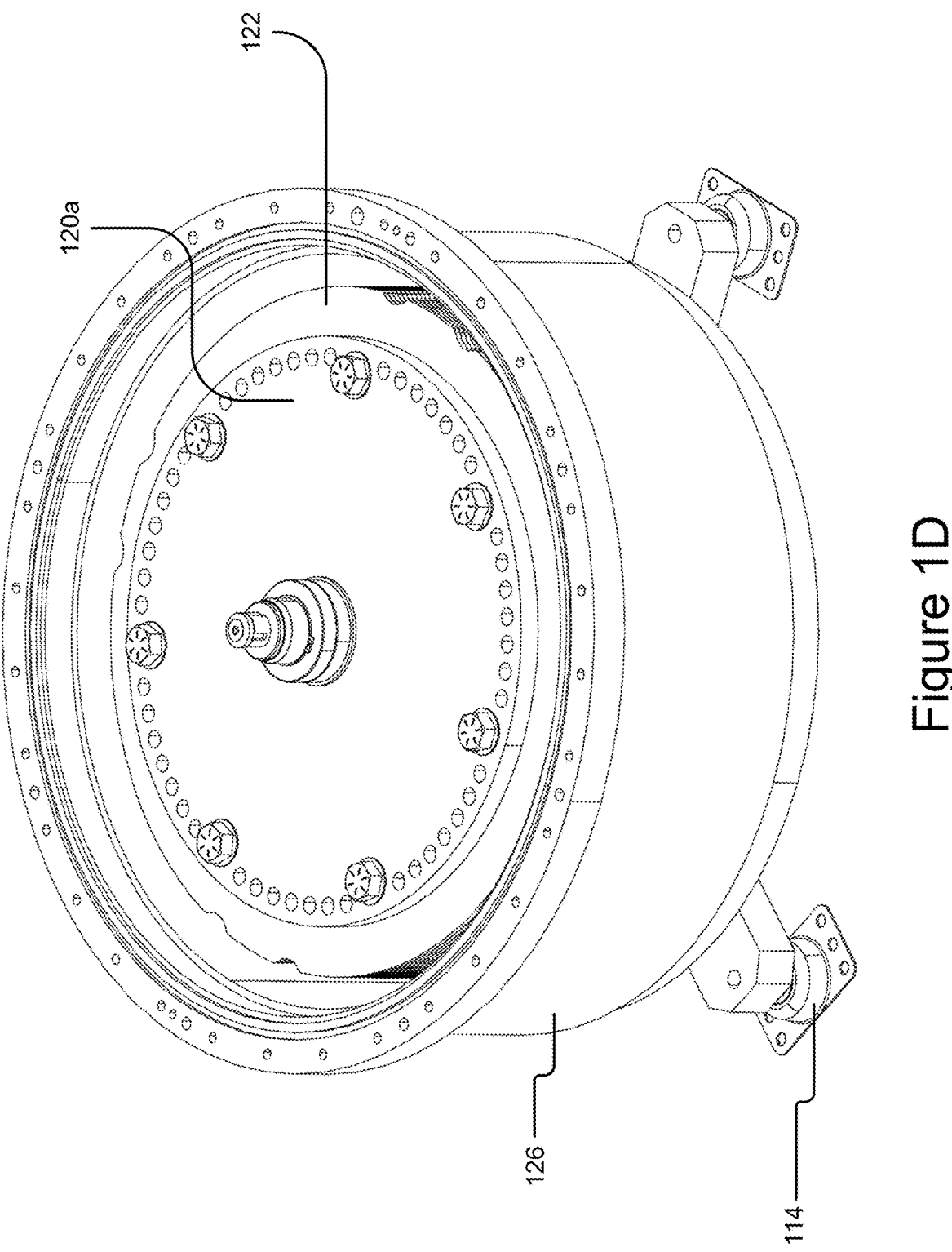
FIG. 1D illustrates the example flywheel assembly with a lid and other components omitted to show an example flywheel inside an enclosure.

FIGS. 1A-1B illustrate an example mechanical-energy storage unit 102 (MESU 102) or flywheel assembly 102 from various angles and views. For example, FIG. 1A illustrates a front-top view, FIG. 1B illustrates a cross section view, FIG. 1C illustrates a front-top view of another example MESU 102 or flywheel assembly 102, and FIG. 1D illustrates a front-top view with an enclosure lid 128 removed to show a flywheel 202 inside a flywheel enclosure 104 of an example MESU 102 assembly.

The improved flywheel assembly 102 may be a mechanical-energy storage unit 102 with configurations and features that improve manufacturability while also providing redundancy, safety, and reliability that allow the flywheel assembly 102 to provide years of safe and relatively maintenance free operation in ways that were not previously possible, for example, as may be noted in the Background and elsewhere herein. Although various configurations are possible and contemplated, the illustrated example flywheel assembly 102 may include a vacuum enclosure 104 and support structure, a massive rotating flywheel 202 (not visible in FIG. 1A) internal to the enclosure 104, a motor-generator 110 that may be fully or partially external to the enclosure 104 and coupled with the flywheel 202, a supercapacitor 106, driver(s) and/or CPUs, inverter(s), circuit breakers, magnetic lift member(s) 152 (also referred to as magnetic lift components or mechanisms herein), bearings, physical or magnetic couplings 118, a vacuum pump 108, and various other components, as described below, although other implementations are possible and contemplated herein.

The enclosure 104 is an example of a support structure that supports various components of a flywheel assembly 102. While example enclosures 104 are shown completely enclosed, in some implementations, an enclosure or other support structure may be open, such as a cage, frame, or other configuration.

The example flywheel assembly 102 may include, among other things, an enclosure 104 that is sealable to provide a vacuum, support to the flywheel 202 (not visible in FIG. 1A), a mounting structure for various components of the assembly, and protection against mechanical failure, among other things. The example enclosure 104 for the flywheel 202 may be configured as a vacuum assembly case with reinforcement including features for coupling the flywheel 202 with the case, an improved shape, and an ability to adjust the flywheel 202 through the case. In some instances, a connection for creating and/or maintaining a vacuum may also be included with the case. Example implementations and features of the enclosure 104 may be described elsewhere herein, although other implementations are possible and contemplated.

The flywheel enclosure 104 may be mounted and/or isolated from a mounting structure by one or more feet 114 or legs, as noted below, and may include mounting structures for accommodating various components of the assembly. For example, a supercapacitor 106 may be mounted to a support structure of or attached to the enclosure 104, which supercapacitor 106 may buffer energy entering/exiting the flywheel 202, for instance, by assisting the motor 110 to spin the flywheel 202 up or receive energy therefrom.

Also, as described below, the enclosure 104 may provide mounting points or structures (e.g., a mounting brace 132) for mounting a motor-generator 110 in line with the axis of rotation of the flywheel 202, although, in other implementations, gears may be used to couple the motor-generator 110 with the flywheel 202. The motor-generator 110 may be coupled with the flywheel 202 via one or more axle 208 components and, in some instances, a magnetic coupling 118 that allows a flywheel axle(s) 208 to remain physically decoupled from a motor-generator 110 rotor while still providing force to pass between them, although a physical coupling may also or alternatively be used, as described below. The motor-generator 110 may have an electrical connection to a supercapacitor 106, inverter, driver, CPU, external grid connection or otherwise, which allows electrical current to flow into the motor-generator 110 to spin up the flywheel 202 or out of the motor-generator 110 to receive stored potential energy from the flywheel 202.

The motor-generator 110 may have various configurations, as noted in further detail elsewhere herein. In some implementations, the motor-generator 110 may be an electrical-vehicle motor or other motor (e.g., a Hyper 9™ motor), such as a brushless alternating current motor (e.g., a 3 phase AC synchronous reluctance internal permanent magnet motor) that can free-wheel in order to allow the flywheel 202 to store power for a longer period of time. The motor size and configuration may vary depending on peak output/input and flywheel 202 size/speed requirements. For instance, a smaller, residential MESU 102 may include a smaller size flywheel 202 with a 30-40 kW motor while a larger, commercial (e.g., for a store, electrical utility, subdivision, etc.) may have a 300-500 kW motor, although other implementations are possible. The motor controller and/or CPU may be the same for various sizes of flywheels 202 or may vary depending on the implementation.

The motor-generator 110 may be coupled with the flywheel 202 using an axle 208 and bearing of the flywheel 202/flywheel enclosure 104. Similarly, in some implementations, the flywheel axle 208 and motor-generator 110 may be coupled using a flywheel motor coupling, which may include a direct connection, magnetic coupling 118, friction clutch, torque converter, gearbox, or otherwise, as described in further detail below.

An example flywheel 202 (not visible in FIG. 1A) may be housed in and/or supported by the enclosure 104 and components thereof. Example flywheels 202 and features thereof are described throughout this disclosure. For example, a flywheel 202 may include a plurality of stacking plates 122 held together by a support structure, such as clamping plates 120 (e.g., using compression and friction). The support structure may include one or more axles 208 that attach thereto and provide support to the flywheel 202. As described in further detail elsewhere herein, the configuration of the support structure and axles 208 may allow flywheel plates to be used without the axle 208 perforating the plates. Depending on the implementation, the axle(s) 208 may be vertically and/or horizontally supported by other components or the flywheel enclosure 104 and may couple with a motor-generator 110 (e.g., as noted above).

For example, an axle 208 may interact with one or more bearings, whether magnetic, metal, ceramic, hybrid ceramic, etc., of the enclosure 104, to allow the flywheel 202 to spin about an axis formed by the axle 208. The enclosure 104 may include or couple with one or more bearings that support the flywheel 202 horizontally to keep it spinning with little-to-no vibration, as described below. In some cases, the bearings may be ceramic to avoid interaction with a magnetic field of a magnetic lift member 152 or other magnetic component.

The axle(s) 208 may interact with the bearing(s) to provide vertical or horizontal support to the flywheel 202, for example, by keeping the axles at a defined location and balanced at a defined axis of rotation.

For instance, a bottom bearing may interact with the bottom of the flywheel 202 and/or a top bearing may interact with the top of the flywheel 202, for example, inside the enclosure 104. In some implementations, a magnetic levitation device or magnetic lift assistance member 152 may be used to reduce the friction or pressure, for example, on one or more of the bearings. For instance, a magnetic levitation device may be disposed at a bottom of the flywheel 202 to apply upward force thereon thereby limiting the force due to gravity on a bottom bearing and/or balancing force between a top and bottom bearing. In some implementations, a magnetic lift assistance member (also referred to as magnetic lift member) 152 may be positioned at a top of the flywheel 202/enclosure 104 to pull the enclosure 104 upward, thereby decreasing the force due to gravity on a bottom bearing(s). As noted in further detail elsewhere herein, the magnetic lift assistance member 152 may lift less then, exactly, or greater than the weight of the flywheel 202 so that there is some, little, or no weight on the bottom and/or top bearing(s).

The amount of weight held by magnets of the magnetic lift assistance member 152 may be adjusted based on a distance from the magnets, as described elsewhere herein. For instance, the flywheel may be manually adjusted by an installer or, in some implementations, the enclosure 104 may include or may be coupled with one or more flywheel positioning components that may adjust the position of the flywheel 202, for example, to ensure that a correct distance between the flywheel 202 and magnetic lift assist mechanism 152, top bearing, bottom bearing, or other component of the assembly 102. For instance, a flywheel positioning component may move the flywheel 202 (e.g., inside the enclosure 104) from a shipping position to an engaged position where it is in a correct position relative to the bearing(s) to minimize bearing wear and friction.

It should be noted that although the enclosure 104 is illustrated as fully enclosed, including reinforcements, welds, seals/O-rings, etc., that allow a vacuum to be maintained inside the enclosure 104 with the flywheel 202; however, it should be noted that other implementations are possible and contemplated herein, such as where the enclosure 104 is fully or partially open.

In some implementations, the flywheel assembly 102 may include various components mounted to the enclosure 104 (e.g., via a lid 128 assembly mounting plate or bracket) that support the operation of the flywheel 202. For instance, the flywheel assembly 102 may include a supercapacitor 106, motor-generator 110 (and associated mounting hardware), driver and CPU/controller 112, vacuum pump 108, various inverters, wiring harnesses, circuit breakers, and other equipment, although other implementations are possible and contemplated herein.

As illustrated in the examples of FIGS. 1A-1D, a flywheel enclosure 104 may be round with a flat bottom and top and various reinforcing ridges, which configuration may provide strength to the enclosure 104 to prevent buckling due to an internal vacuum while also preventing external damage in case of a mechanical failure of the flywheel 202. It should be noted that the enclosure 104 may be square, hexagonal, etc. It may have rounded (e.g., as illustrated in FIG. 1D) or flat sides (e.g., as illustrated in FIG. 1A). As illustrated in FIG. 1A, a mounting plate may be positioned on top of the enclosure 104 components mounted thereto, as described in further detail below.

In some implementations, as illustrated in the examples, the flywheel assembly 102 may include one or more (e.g., 3 and 4 arms are illustrated) motor mount braces 132 that couple with a lid 128 of the flywheel enclosure 104 and extend upward to support a motor mount, which may comprise a ring that holds the motor-generator 110 in alignment with an axis of rotation of the flywheel 202. In some instances, the motor mount braces 132 may include linear actuators that lift the motor-generator 110 vertically in order to decouple the motor-flywheel 202 coupling, such as the magnetic coupling 118 described in further detail below. The flywheel assembly 102 may include a lid assembly mounting plate(s) 130 that couple with top ribs or other structures of the enclosure 104 and provide mounting points for the various components of the flywheel assembly 102. In some instances, the lid 128 or lid assembly mounting plate(s) 130 may have various perforations that allow the motor mount braces 132, axles 208, motor-flywheel 202 coupling, vacuum pump 108 connection and other components to pass therethrough. Accordingly, the components may be securely mounted to mounting plate 130, lid 128, enclosure 104, or otherwise (e.g., as illustrated in the example figure) in order to speed assembly and improve stability.

As shown in the example of FIG. 1A, the enclosure 104 may have a plurality of reinforcing structures, such as ribs, rings, etc.

The enclosure 104 may also include one or more feet 114 or other supports that provide support to the ribs (e.g., the side or bottom ribs) or other structures (e.g., a bottom plate) of the enclosure 104 to secure the flywheel assembly 102, support the weight of the flywheel 202, and/or isolate the flywheel 202's movement/vibration; although, it should be noted that vibration is ideally limited by balancing the flywheel 202 and acceleration, temperature, or other sensors may be located in the bearings, axles 208, enclosure 104, or other components.

FIG. 1B illustrates an example cross section view of a flywheel assembly 102. For instance, as shown in the figure, a flywheel 202 having a number of stacking plates 122 and a top and bottom axle 208b is located inside an enclosure 104. The bottom axle 208b of the flywheel 202 is shown interacting with bottom bearings that support the flywheel 202 horizontally and/or vertically. The top axle 208a of the flywheel 202 is shown passing through a magnetic lift member 152 and into a magnetic coupling 118, which couples the axle 208 with a stator (directly or via other components, axles 208, drive shafts, gears, etc.) with the motor-generator 110, which is held vertically above the axle 208 using the motor braces 132. Additionally, as noted elsewhere herein, various sensors may be located throughout the assembly, such as the RPM sensor mount 116 that is located adjacent to the magnetic coupling 118, as well as various temperature, acceleration, etc., sensors that may be positioned adjacent to the motor 110, bearings, and other components of the assembly. These and other implementations and features are described in further detail below.

FIG. 1C illustrates another example MESU 102 or flywheel assembly 102 with a different implementation of the enclosure 104. As illustrated, an enclosure 104 may be a cylindrical enclosure with a base tub 126 and a lid 128. The enclosure 104 may also include one or more feet 114 (e.g., three are illustrated in FIG. 1C) or legs support the flywheel assembly 102. A foot 114 may include a bushing or other component that isolates vibrations, bolt holes to bolt the flywheel assembly 102 to a floor or other location.

In the depicted example, the motor-generator 110 may be mounted higher on motor mount braces 132 and/or base than the example of FIG. 1A, for example, to allow access to mount or remove the motor-generator 110, magnetic coupling 118, bearings, or other components. Additionally, while the other components illustrated in FIG. 1A are not shown in FIG. 1C, they may also be mounted to the lid 128 or another location of the flywheel assembly 102. For instance, a vacuum pump 108, supercapacitor 106, chemical battery, driver, CPU, etc., may be mounted to the lid 128, tub 126, other portion of the flywheel assembly 102, or otherwise.

FIG. 1D illustrates the example flywheel assembly 102 of FIG. 1C with the lid 128 and other components omitted to show an example massive flywheel 202 inside the enclosure 104. As shown, the flywheel 202 may be positioned at a center of the enclosure 104, although other implementations are possible. As illustrated in the example of FIG. 1D, a flywheel 202 may include one or more clamping plates 120 (the top clamping plate 120*a* is shown), one or more stacking plates 122, one or more bolts holding the clamping plates 120 together and/or to the stacking plates 122, and one or more axles 208. These and other features and implementations are described in further detail elsewhere herein.

FIGS. 2A-3D illustrate an example flywheel 202 and various components, views, and constructions thereof. There are a number of innovative features in the flywheel 202. For example, the flywheel 202 may include flywheel plates (120 and/or 122) that are coupled together using friction, which may be performed in addition to or in lieu of other connections, such as adhesive, welding, or otherwise. Some implementations of the flywheel 202 include bolts through components while others do not include bolts through components. Similarly, some implementations of the flywheel 202 include two separate axles 208—a top axle 208*a* and a bottom axle 208*b*. For instance, while previous flywheels 202 may include bolts attaching each of their components together, some implementations of the flywheel 202 herein may separate the axle 208 and/or use a clamping force from clamping plates 120 (and/or axles 208) to increase friction between the stacking plates 122 themselves, which may improve manufacturing and reduce points of failure when the flywheel 202 is spinning at high speeds.

In some implementations, clamping plates 120 may be used on the top and bottom of the flywheel 202 to support the flywheel 202, for example, by coupling the stacking flywheel plates 122 together and/or to axles 208. A top clamping plate 120*a* and a bottom clamping plate 120*b* may be drawn together by bolts at or near its peripheral edge, as described in elsewhere herein, which applies pressure inward on the stacking plates 122 in an axial direction thereby increasing friction. The friction may also allow rotational force to be transferred through the stacking plates 122 while also preventing them from moving out of alignment, which may throw the balance of the flywheel 202 off.

Depending on the implementation, the clamping force from the clamping plates 120 may be applied to the stacking plates 122 directly (e.g., by direct contact between the clamping plates 120 or stacking plates 122) and/or via other components, such as a portion of an axle 208 or other contact points (e.g., bushings or washers, as described below). For example, a clamping plate 120 may apply force to a center of the stacking plates 122 via a top and bottom axle 208*b* (and/or washer(s), ball washer(s), bushings at a peripheral edge or arm end, and/or otherwise).

In some implementations, the clamping plates 120 may be less massive than the stacking plates 122 (although other implementations are possible, as noted herein), so each type of plate may expand (and, potentially, become thinner) differently, especially at the peripheral edge. Accordingly, in some instances, bushings or other components may allow the stacking plates 122 to move relative to the clamping plates 120 while the clamping force is continuously applied.

The clamping plates 120 may have various contours and configurations to allow them to provide clamping force and other functionality. In some implementations, the stacking plates 122 may be configured differently from the clamping plates 120 and their function is primarily to add rotational mass to the flywheel 202 in order to store energy. The stacking plates 122 may be massive plates that are substantially round or may include various contours based on interaction with the clamping plates 120 or an assembly fixture. Example stacking plates 122 and clamping plates 120 are described in further detail below.

As described in further detail elsewhere herein, shapes, configurations, or features of the clamping plate(s) 120 may be designed to improve their interaction with the magnetic lift member 152, for example, to improve an amount of space, a magnetic pull, or otherwise. In some instances, it may further be configured to reduce eddy currents caused by the magnetic lift member 152. These and other features are further described, for example, below.

Figure 2A:
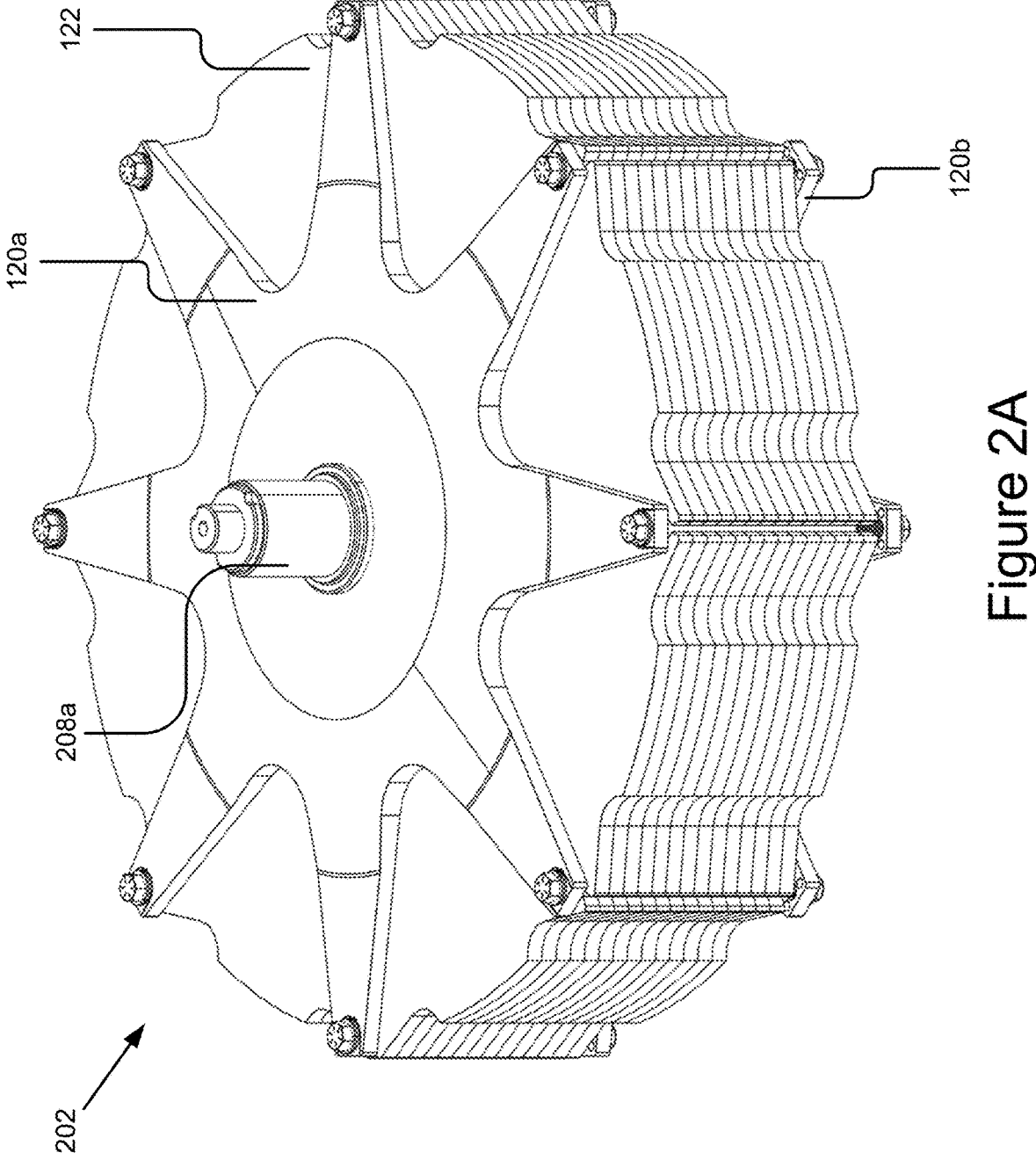
FIG. 2A illustrates a side-top view of the example flywheel.

FIG. 2A illustrates a side-top view of the example flywheel 202. As illustrated, a plurality of stacking plates 122 may be continuously stacked with their faces touching each other to minimize space consumed and flex while increasing friction. Fourteen stacking plates 122 are illustrated, although other implementations are possible and contemplated herein. As illustrated, there may be a space 142 between one or both of the clamping plates 120 and the stacking plates 122. Although this space 142 is illustrated as being relatively large and uniform, it may be smaller or non-existent for one or both of the axles 208. For instance, the top clamping plate 120*a* may contact a top-most stacking plate 122, while there may be only a few millimeters between the bottom clamping plate 120*b* and the bottom-most stacking plate 122, which space may vary based on clamping force applied and flex of the clamping plate 120.

Figure 2B:
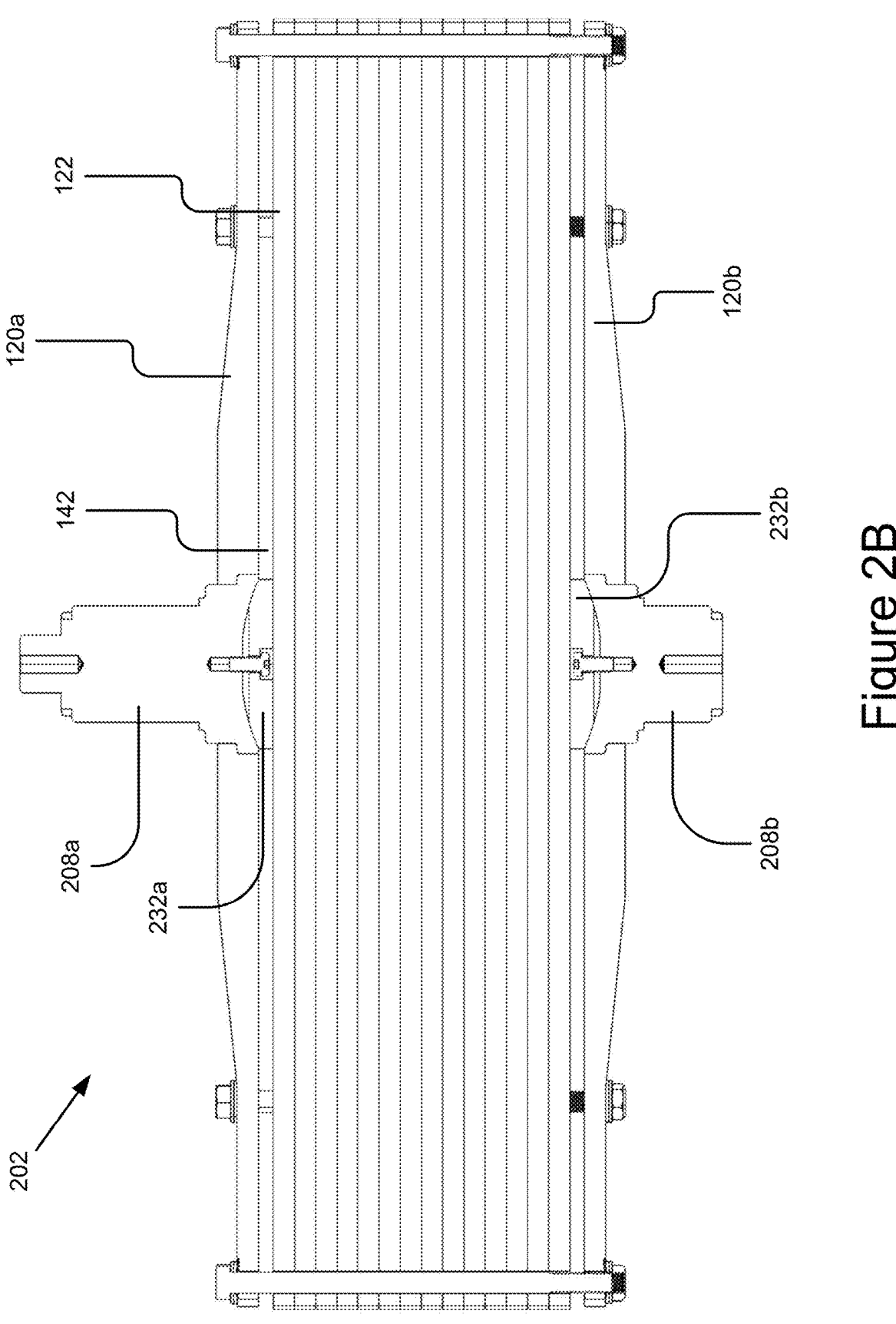
FIG. 2B illustrates a cross sectional view of an example flywheel.

As illustrated in the example flywheel 202 of FIGS. 2A and 2B, a bottom axle 208*b* may be coupled with a bottom clamping plate 120*b*. The bottom clamping plate 120*b* then interacts with a bottom flywheel stacking plate 122 (e.g., via bushings, an axle washer 232*b*, a portion of the axle 208, etc.). Various quantities of stacking flywheel plates may be stacked together depending on desired energy capacity, as noted elsewhere herein. Similarly, a top clamping plate 120*a* may interact with a top-most flywheel stacking plate 122 (e.g., via bushings, axle washer 232*a*, etc.). The top clamping plate 120*a* may be coupled with a top axle 208*a*. In other implementations, a bottom face of the top clamping plate 120*a* may rest directly against the top face of the top-most stacking plate 122.

In some implementations, each of the stacking plates 122 may be identical, and each of the clamping plates 120 may be identical, although other implementations (e.g., sizes, configurations, etc.) are possible and contemplated, as noted below. Similarly, the top and bottom axle 208*b* may be the same or different (e.g., having a different length, interacting with different bearings or configurations, as illustrated herein.

Figure 2C:
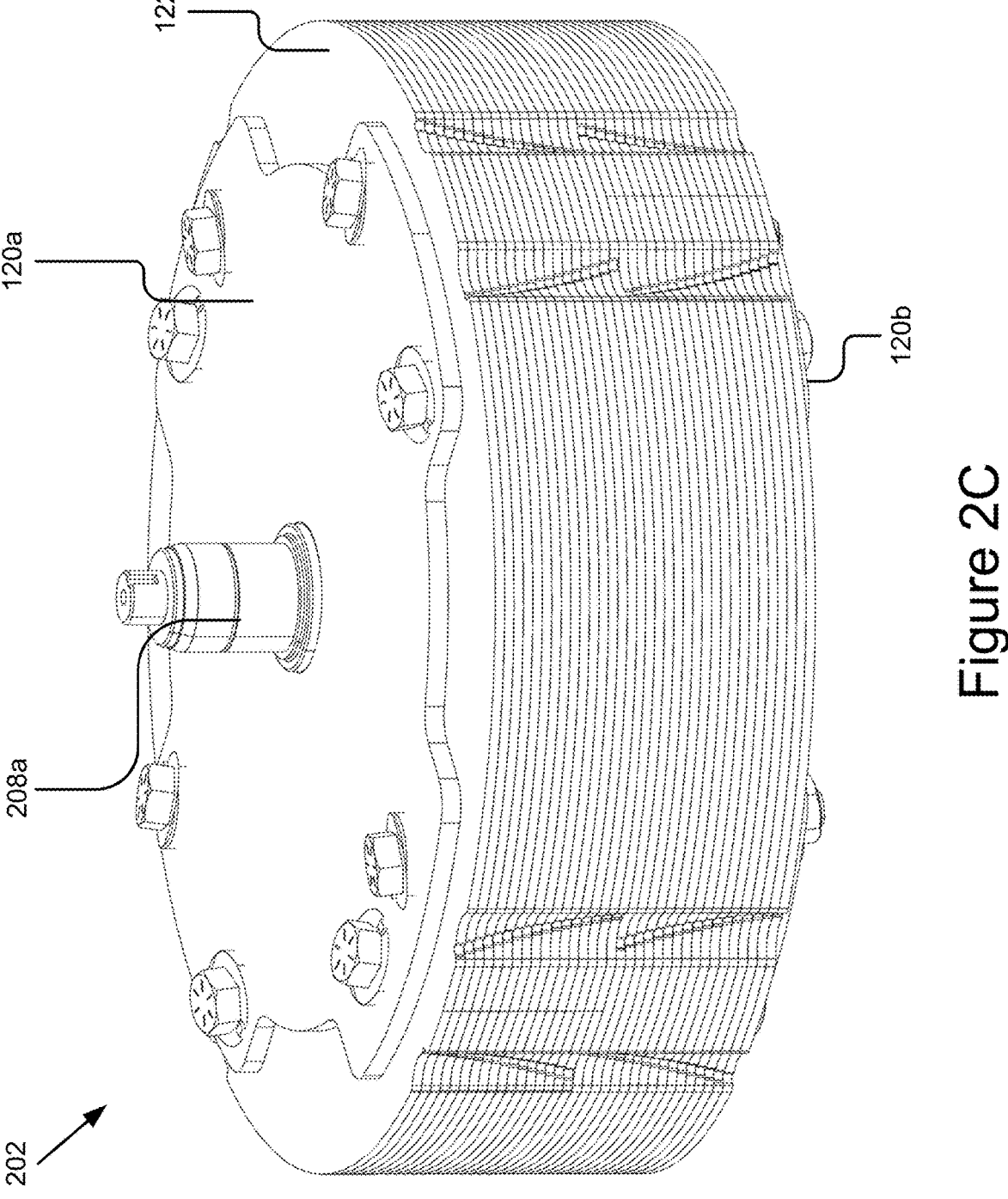
FIGS. 2C and 2D illustrate side-top views of example flywheels.
Figure 2D:
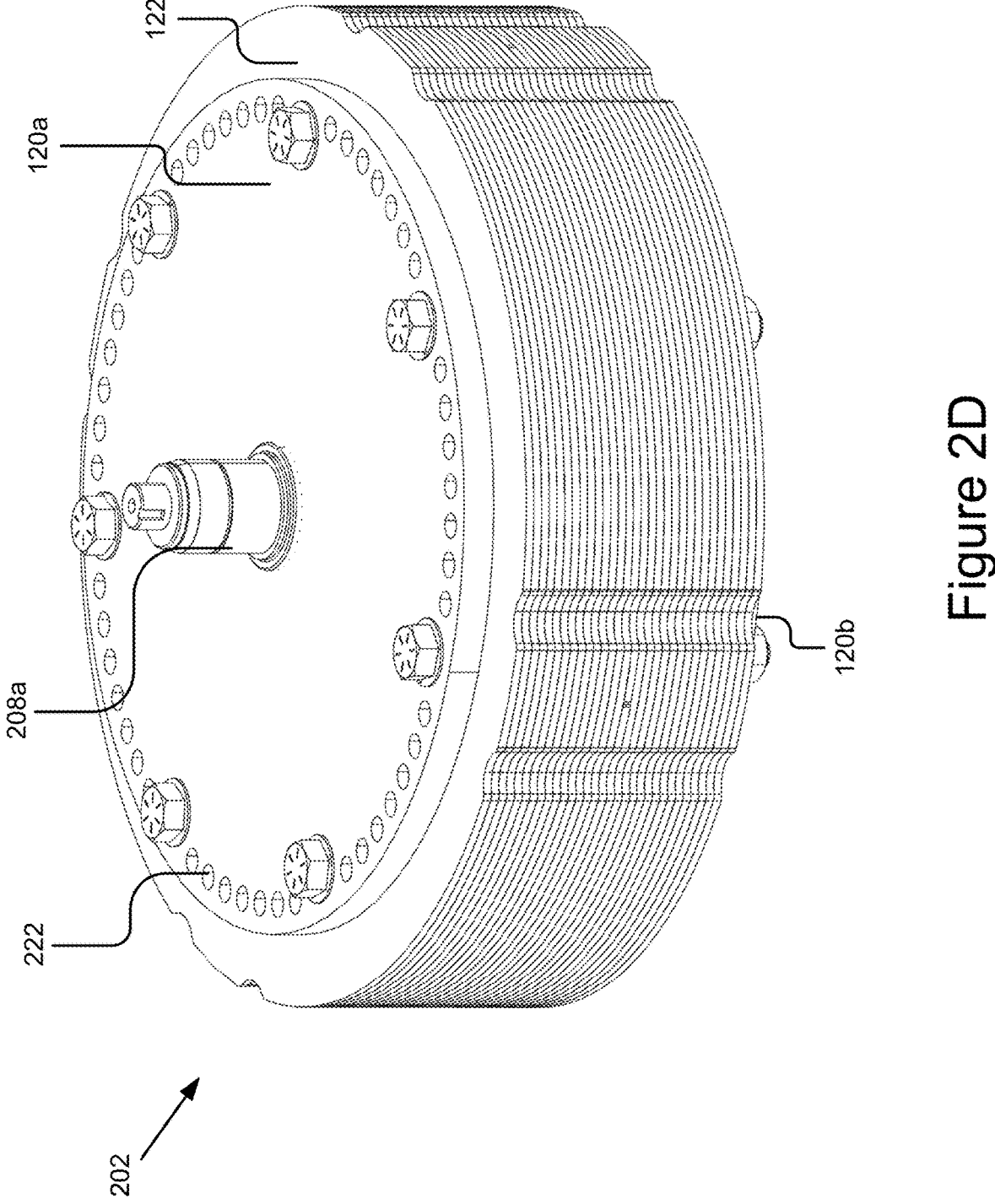
Figure 3A:
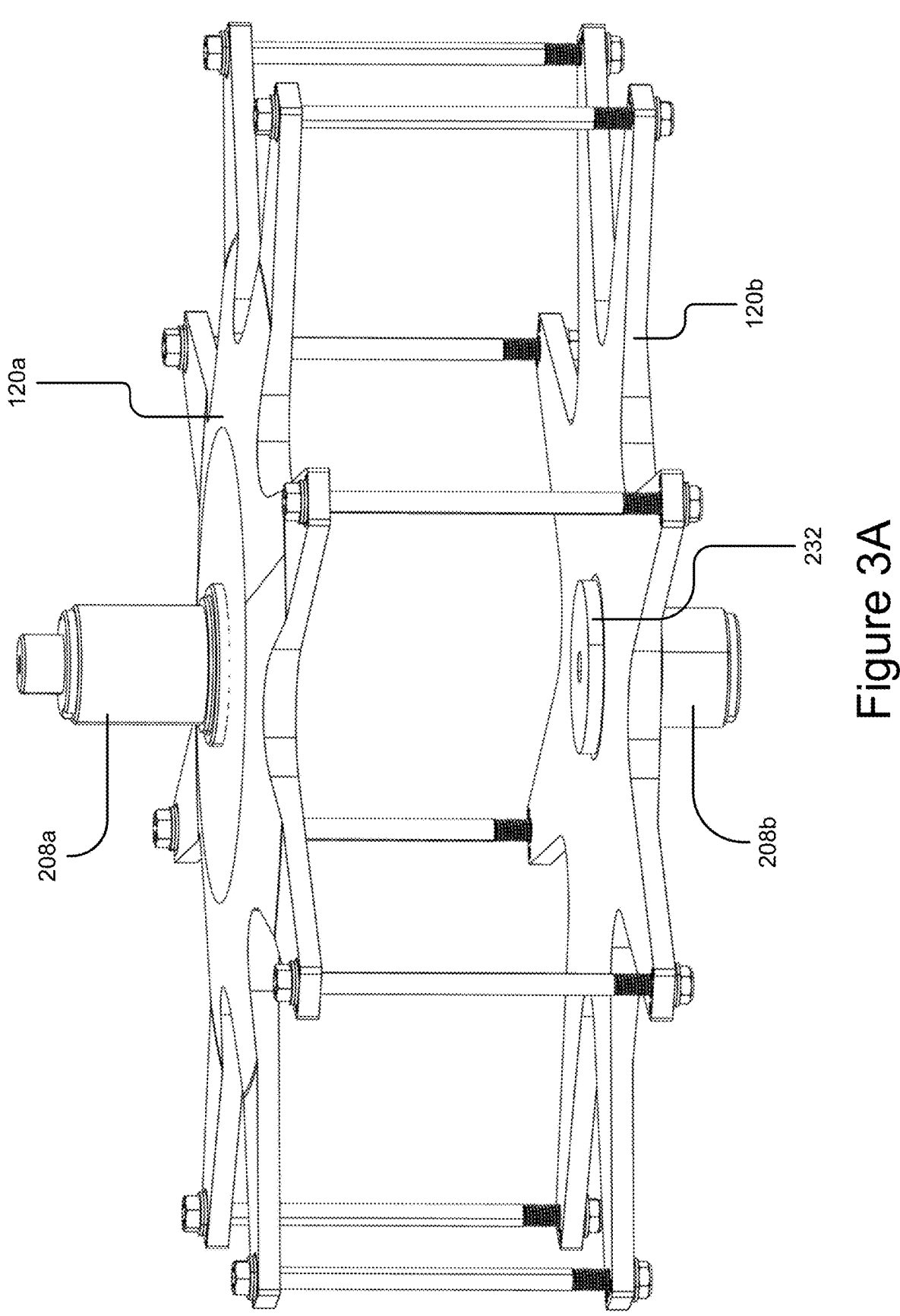
FIG. 3A illustrates an example flywheel support structure including top and bottom clamping plates.
Figure 3B:
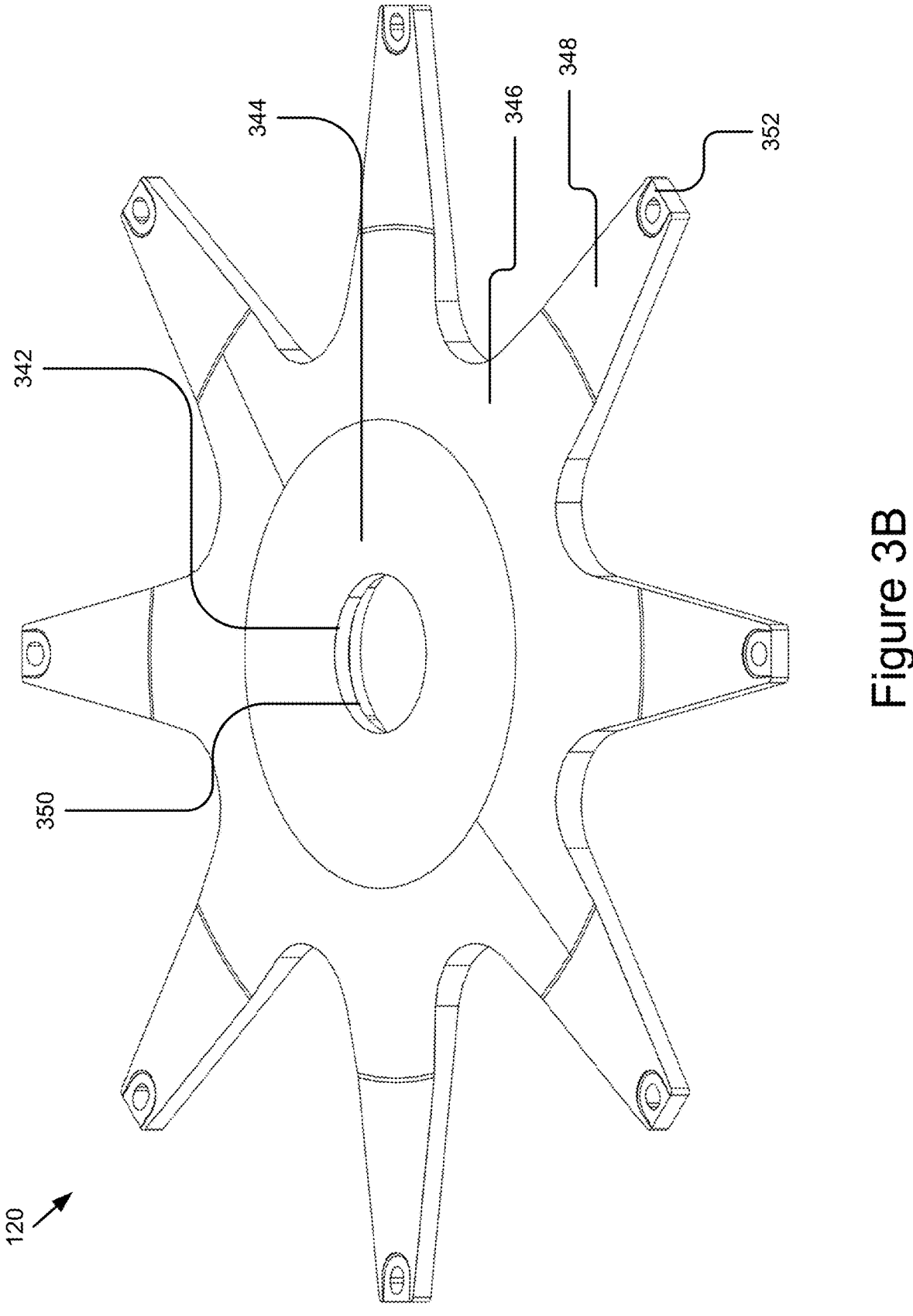
FIG. 3B illustrates an example clamping plate.

As illustrated, when assembled, the clamping plates 120 of the flywheel 202 may align with the stacking plates 122. In some implementations, a clamping plate 120 may have a star shape (e.g., as illustrated in FIGS. 3A and 3B) where the tip of each arm or branch of the clamping plate 120 has a bolt hole that receives a bolt for clamping the clamping plates 120 together. In some implementations, a clamping plate 120 may have another shape (e.g., as illustrated in FIGS. 2C and 2D) including one or more perforations proximate to a peripheral edge.

Similarly, the configuration of the stacking plates 122 may be based on the shape (e.g., the position and quantity of branches of the clamping plate 120), as described in further detail below. For instance, bolt points of the stacking plates 122 may correspond to bolt points of the clamping plates 120 whether or not the stacking plates 122 contact the bolts.

FIG. 2B illustrates a cross sectional view of an example multi-part flywheel 202. As illustrated in the example implementation, a top clamping plate 120*a* may be connected with a top axle 208*a*. For instance, a top axle 208*a* may pass through the top clamping plate 120*a* so that the top clamping plate 120*a* may apply downward force on the axle 208. In some implementations, the axle 208 may include multiple parts, such as an axle 208 portion and an axle washer 232*a* or 232*b*, where the washer 232 (or a bottom portion of the top axle 208*a*) contacts a top-most stacking plate 122. Accordingly, via the axle 208, the top clamping plate 120*a* may apply force to the stacking plate(s) 122. It should be noted that other configurations, such as direct contact or contact through another device are possible without departing from the scope of this disclosure. Accordingly, the clamping plate 120 may apply pressure at a center of the stacking plate(s) 122 via the washer and/or axle 208.

Similar to the description of the top axle 208*a* above, a bottom axle 208*b* may be coupled to a bottom clamping plate 120*b* and may apply force to a bottom-most stacking plate 122. It should be noted that other configurations are possible, such as where the contact is direct, where the axles 208 are integrated with the clamping plates 120, where the axles 208 are integrated with one or more stacking plates 122, or otherwise.

Additionally, as described in further detail below, force may be applied (e.g., in an axial direction) to a center, periphery, and/or other area of the stacking plate(s) 122. For example, bolts may be tightened down on the clamping plate(s) 120, which apply force to an outer edge of the stacking plates 122. The force may be applied via direct contact between the clamping plates 120 and the stacking plates 122 or via an intermediary device, such as a bushing or washer (e.g., a ball washer or axle washer 232). In some instances, the clamping plates 120 may flex between the axle(s) 208 and the bolt(s) to provide the pressure. Accordingly, friction can be increased between the stacking plates 122. In some implementations, the stacking plates 122 may be simple, solid plates (e.g., as in FIG. 3C) rather than having perforations for fasteners in the plates, which may reduce strength and introduce stress risers due to centrifugal force, and which may lead to increased complexity and failure modes. In other implementations, the stacking plates 122 may have perforations (e.g., as in FIG. 2C or 2D) through which bolts may pass, which may increase a radius of the plates, provide simplicity in manufacturing, or increase an inter-plate (e.g., due to friction) force.

As described below, the bolts may be tensioned to varying levels of tension to cause the friction force. Although different configurations are possible and contemplated, as noted elsewhere herein, the flywheel 202 may include 8 bolts located around or proximate to a peripheral edge. Each bolt may be tightened to provide a defined torque or based on an applied force before the bolts are torqued (e.g., to apply a force of 2600 pounds per bolt), which may cumulatively provide a relatively even clamping and friction force across the stacking plates 122 (e.g., 16,000-21,000 pounds of clamping force).

In addition to their roles in clamping together the clamping plates 120, the bolts may include other features, such as the ability to mitigate failure of one or more stacking plates 122 (e.g., by catching a stacking plate 122 or portion thereof that slips or breaks). In some instances, the bolts may be replaced with other bolts of varying weights to assist in balancing the flywheel 202. Other details and implementations are possible and/or described elsewhere herein.

It should also be noted that the top axle 208*a* and the bottom axle 208*b* (e.g., as described in the examples of FIGS. 4A and 4B) should be aligned as perfectly as possible to reduce vibrations and improve alignment with bearings, etc. Although other implementations are possible, ball washers (e.g., 232) may be used with the axles 208 to allow some adjustability during assembly to improve alignment. It should be noted that flat washers or no washers (e.g., the axles 208 may be single components instead of broken into an axle body and axle washer 232) may be used.

As the axles 208 or axle washers 232 contact the stacking plates 122, the application of clamping force by the bolts may cause one or more of the clamping plates 120 (e.g., the arms thereof) of the bend slightly and increase the force at the center that is applied by the axles 208/axle washers 232. Depending on the implementation, the thickness of the axle washer 232 (or similar component) and the configuration of the clamping arms may be such that the distance between the ends of the arms (e.g., to the stacking plates 122) may be minimalized when the plates are clamped. In some implementations, in addition or alternative to the clamping force at the center of the stacking plates 122, the clamping plates 120 may apply clamping force along a peripheral edge of the stacking plates 122.

FIG. 2C illustrates a side-top view of another example flywheel 202, according to some implementations. In the example of FIG. 2C, the shape of the clamping plates 120 has an X shape with two bolt holes proximate to the radial edge of each arm thereof. In the depicted example, the bolts may be angled as they pass from the top clamping plate 120*a*, through the stacking plates 122, and to the bottom clamping plate 120*b*. By angling the bolts, rotational forces across the clamping plates 120, stacking plates 122, and axles 208 may be reinforced, which reduces the odds that the plates will move out of alignment when the flywheel 202 is spun up or down though the axle(s) 208.

In the depicted example, the bolts may be angled toward each other or away from each other on alternating clamping plate arms, which improves uniformity of force (e.g., circumferentially and axially) and rotational balance. For instance, in a first arm, the bolts are angled away from each other at the top plate, while, at a second arm 90 degrees from the first arm, the bolts are angled toward each other at the top plate, which pattern may repeat, as illustrated. Where the top clamping plate 120*a* and the bottom clamping plate 120*b* are the same, they may be rotated 90 degrees, so that the holes on each match the angles of the bolts. For example, a bolt may be perpendicular to a radial direction of the flywheel 202 and angled around the periphery, for example, at an angle to the axial direction of the flywheel 202.

In the depicted example of FIG. 2C, the bolts extend through the top and bottom clamping plates 120*b* and through perforations in the stacking plates 122. In the example implementation where the bolts are angled, the bolts may use wedge shaped washers that allow the force from the bolts to be applied to the clamping plates 120. In some implementations whether with angled or straight (e.g., axial) bolts, the bolts and associated nuts may be tapered to allow them to extend partially into countersunk holes in the clamping plate(s) 120.

In the depicted example of FIG. 2C, the top clamping plate 120*a* (and potentially the bottom clamping plate 120*b*) may be substantially flat on its top and bottom surfaces, which allows the it to contact the stacking plates 122 and/or interact with a magnetic lifting component 152. For example, a very flat top surface of the top clamping plate 120a that interacts with a magnetic lifting component may reduce eddy currents in the top clamping plates 120a caused by rotation relative to the magnetic lifting member 152.

FIG. 2D illustrates a side-top view of another example flywheel 202, according to some implementations. In the depicted example, the bolts extend axially through perforations 222 in the top clamping plate 120a, the stacking plates 122, and the bottom clamping plate 120b. Depending on the implementation, the stacking plates 122 may have an equal quantity of perforations 222 as the quantity of bolts clamping the clamping plates 120, the clamping plate(s) 120 may include additional perforations 222 proximate to their peripheral edge(s). These additional perforations 222 may be used in balancing the flywheel 202, for instance, by drilling out the holes or adding plugs to the holes. As noted elsewhere herein, there may be a space between one or both of the clamping plates 120 and the stacking plates 122. For instance, the top clamping plate 120a and top stacking plate 122 may lack a space (e.g., as at 142), which may prevent the top clamping plate 120a from flexing, thereby improving its flatness and interaction with a magnetic lift member. In some implementations, there may be a small gap/space between the bottom clamping plate 120b and a bottom-most stacking plate 122, which allows some flex in clamping (e.g., to increase a force at the center/axles 208). For instance, a portion of the bottom axle 208b and/or an axle washer (whether a ball washer or flat) may be used to provide a space between a center of the bottom clamping plate 120b and the bottom-most stacking plate 122.

As noted below, in some implementations, the stacking plates 122 (e.g., in any of the examples of FIG. 3C) may include contours or scallops 310 around a peripheral edge, which may reduce failure points due to radial stress around bolt holes and/or assist with aligning the plates. For instance, a scallop 310 may be a scalloped shape or contour removed or omitted from a peripheral edge of a stacking plate 122.

FIGS. 3A-3D illustrate example components, views, and constructions of a flywheel 202. There are a number of innovative features in the flywheel 202. The flywheel 202 may stack flywheel plates (e.g., 120 and/or 122) using friction, which may be performed in addition to or in lieu of other connections, such as adhesive, welding, or otherwise. For instance, the illustrated example may include stacking plates 122 that are friction fit in order to improve manufacturing and reduce points of failure when the flywheel 202 is spinning at high speeds.

For example, clamping plates 122 may be used on the top and bottom of the flywheel 202 to support the flywheel 202, for example, by coupling the stacking flywheel plates 122 together and/or to axles 208. For instance, a top clamping plate 208a and a bottom clamping plate 208b may be drawn together by bolts around its periphery (e.g., at the tips of star/arms), which applies pressure inward on the stacking plates 122 thereby increasing friction. The friction allows rotational force to be transferred through the stacking plates 122 while also preventing them from moving out of alignment, which may throw the balance of the flywheel 202 off.

Depending on the implementation, the clamping force from the clamping plates 120 may be applied to the stacking plates 122 directly (e.g., by direct contact between the clamping plates or stacking plates) or via other components. For example, a clamping plate 120 may apply force to a center of the stacking plates 122 via a washer 232 (e.g., a ball washer) or other portion of an axle 208 and/or bushings at a periphery of the clamping plates 120. For instance, in some implementations, because the clamping plates 120 may be less massive than the stacking plates 122, each type of plate may expand (and, potentially, become thinner) differently, especially at the peripheral edge. For example, bushings or other components may allow the stacking plates 122 to move relative to the clamping plates 120 while the clamping force is continuously applied.

The stacking plates 122 may be configured differently from the clamping plates and their function is primarily to add rotational mass to the flywheel in order to store energy. The stacking plates 122 may be massive plates that are round or may include various contours based on interaction with the clamping plates 120, for example.

FIG. 3A illustrates an example flywheel support structure, which may include a bottom axle 208b, bottom clamping plate 120b, bolts, top clamping plate 120a, and top axle 208a according to some implementations. In the depicted example, for clarity, stacking plates 122 have been omitted for clarity. The example support structure of FIG. 3A may correspond to the example implementation of the flywheel 202 in FIG. 2A.

As illustrated in the example of FIG. 3A, the top axle 208a may couple with and/or extend through a top clamping plate 120a and a bottom axle 208b may couple with and/or extend through a bottom clamping plate 120b. In some implementations, a clamping plate's 120 primary purpose may be to induce friction and transfer force to/from the stacking plates 122 (not visible in FIG. 3A) rather than increase rotational inertia. Accordingly, the clamping plates 120 may be designed (e.g., by being thinner and/or not extending radially outward as far as the stacking plates 122) to apply vertical force to the plates 122, potentially while reducing high stress areas at the periphery where the clamping plates 120 may fail at high speeds. Accordingly, the clamping pressure may be increased and risk due to structural/material failure decreased. Example implementations of a clamping plate 120 are described in additional detail in reference to FIG. 3B below.

Additionally, the clamping plate(s) 120 may include a connection area for coupling with the axle(s) 208, which allows the rotational force to be transferred between the plates 120 and the axles 208. For instance, as described elsewhere herein, an axle 208a and/or 208b may extend fully or partially through a clamping plate 120 and have or more shapes or structures that allow rotational, as well as clamping force, to be applied onto the stacking plates 122 (e.g., via an axle 208). In some implementations, the axle(s) 208 may have axle washers 232/axle ball washers that extend beyond an inner edge of the stacking plate to apply force the stacking plates (e.g., while leaving a gap or space between the clamping plate 120 and stacking plate 122). Although the washers 232 are illustrated as being approximately the size of the passthrough in the clamping plates 120, it should be noted that they may be omitted, combined with the axle body, be smaller radius than the passthrough, or be larger than the pass through (e.g., to apply force to the stacking plates 122 over a larger area).

As illustrated in the example, a number of bolts may extend through the ends of arms of the clamping plates 120 and be tightened to draw the clamping plates 120 toward one another. As the axles 208 or axle washers 232 may be contacting the stacking plates 122, the application of clamping force by the bolts may cause the arms of the bend slightly and increase the force at the center that is applied by the axles/axle washers 232 and/or directly by the clamping plate(s) 120. The thickness of the axle washer 232 (or similar component) and the configuration of the clamping arms may be such that the distance between the ends of the arms (e.g., to the stacking plates 122) may be minimalized when the plates 120 and/or 122 are clamped.

In some implementations, in addition or alternative to the clamping force at the center of the stacking plates 122, the clamping plates 120 may apply clamping force along a peripheral edge of the stacking plates 122. For instance, the ends of the arms may directly or indirectly contact the stacking plates 122 to apply the clamping force nearer to the outer edges of the stacking plates 122 and increase inter-plate friction. Where indirect contact is made, it may be via another component, such as a bushing or pivot point, or another intermediary device. The bushing(s) may allow the stacking plates 122 to move relative to the clamping plates 120, for example, because the stacking plates 122 may elongate to a greater extent than the clamping arms under load due to their relative mass and position of the mass (e.g., where the clamping plates 120 have vertical strength but less weight per volume/cross section). Accordingly, clamping force at the periphery may be increased, thereby increasing the ability for torque to be transferred through the stacking plates 122, clamping plates 120, and axles 208.

The top axle 208*a* may couple with and/or extend through a top clamping plate 120*a* and a bottom axle 208*b* may couple with and/or extend through a bottom clamping plate 120*b*. As a clamping plate 120 may induce friction and transfer force to/from the stacking plates 122. Accordingly, the clamping plates 120 may be designed to apply axial force to the plates without having high stress areas at the periphery where the clamping plates 120 may fail at high speeds. Accordingly, the clamping pressure may be increased and risk due to structural/material failure decreased. Example configurations of the clamping plates 120 are described elsewhere herein.

The clamping plates 120 may be constructed from alu-minum, steel, or another material. For instance, the plates 120 may be constructed from a ferromagnetic steel (e.g., AR500 steel plate) and may be stamped, formed, or machined into the desired shapes. Example masses of the clamping plates 120 may be 66-68 pounds when constructed from steel, although other implementations are possible.

FIG. 3B illustrates an example clamping plate 120. As illustrated, the clamping plate 120 may have an axle-con-nection region 342, a flat center region 344, a tapered region 346, and outer arm portions (also referred to as arms) 348. For instance, the clamping plate 120 may be a star shaped with contours in the outer edge that define the arm portions 348. It should be noted that although eight arms 348 are illustrated, other quantities may be used depending on desired strength and maximum rotational frequencies (e.g., the clamping plate 120 may be round as in FIG. 2D or have four arms as in FIG. 2C).

In some implementations, the axle-connection region 342 may connect to an axle 208 in order to transfer force between the clamping plate 120 and the axle 208. The axle-connection region 342 may include an axle interaction step 350 that allows the clamping plate 120 to apply clamp-ing force on the axle 208 (e.g., on a corresponding lip or step thereof), although the axle 208 may be integrated with the clamping plate 120 or the force may simply be applied onto the axle 208 by a bottom edge of the clamping plate 120 (e.g., in some instances, no step may be included in the implementation). For instance, the axle-connection region 342 may include a perforation in the clamping plate 120 through which the axle 208, or a portion thereof, may pass. For example, an axle washer 232 may be coupled with the axle at the step 350, or a portion of the axle 208 itself may interact with the step 350.

In some implementations, various mechanisms may be used at the axle-to-clamping-plate interface or connection region 342 to keep the axle 208 and clamping plate 120 mechanically connected, so that rotational force may be transferred between them. For instance, the hole in the clamping plate 120 that accepts a portion of the axle 208 may have an oval shape, circular shape, ridged shape, and/or a flat area (e.g., to be shaped like a D, whether the flat area is large or small), which may prevent them from twisting relative to one another. For instance, where a small flat area is provided or there is an oval shape at the interface, stress risers may be reduced in the plates, which may be particu-larly beneficial at higher rotations per minute. For example, in some implementations, rather than being bolted through or having a square or other shape with large protrusions, which may increase stress in the flywheel 202, especially where the flywheel 202 is massive or spinning at a high rate, the clamping plate 120 to axle 208 interface may be shaped to induce little stress into the axle 208 or clamping plate 120 while allowing torque to be transferred.

For example, the axle connection 342 may include vari-ous shapes to the pass through that interact with correspond-ing shapes of the axle 208. The perforation or a portion thereof may be oval shaped, ridged shape, or have a flat or "D" shaped area, key, or other shape that allows torque to be transferred between the stacking plate 122 and the axle 208 (e.g., in addition to the torque that may be applied to the axle 208 by its contact with the top/bottom-most stacking plate 122) without significantly increasing material stress at the connection point. In some implementations, this shape may be applied to the entirety of the perforation or only to a portion or step thereof (e.g., as in the illustrated step). This shape may be small, such as a $\frac{1}{8}^{th}$ inch deviation in diameter or a flat section. In some implementations, a clamping plate 120 and an axle 208 may be integrated (e.g., machined from a single piece or welded together).

Although other implementations are possible, the axle 208 and perforation diameter (e.g., at 342) may be 3-5 inches. For example, a first (e.g., illustrated at a top of the figure) perforation/axle diameter may be 3.75 inches. A second (e.g., illustrated downward from the first) perforation (e.g., step in the perforation)/axle diameter may be 4.25 inches to allow force to be applied from the first diameter onto the axle 208 and then onto the stacking plates 122. In implementations where the second step/perforation/axle portion are oval shaped, the oval may vary from 4.375 inches to 4.250 inches, for example, although other imple-mentations are possible and contemplated herein.

In some implementations, the flat region 344 of the clamping plate 208 may extend outward from the axle connection 342 and provide a location with which the magnetic lift assist member/mechanism 152 may interact to lift the flywheel 202. For instance, the flat region 344 of a top clamping plate 120 may interact with the magnetic field of the magnetic lift assist member 152 to lift the flywheel 202. In some instances, it may additionally or alternatively inter-act with a bearing (e.g., a top bearing). For example, the flywheel 202 may be lifted until the flat region 344 contacts the magnetic lift assist and then lowered slightly to create a gap, which may reduce friction. The adjustment may oth-erwise be performed to increase or decrease distance to a magnetic lift member 152, a top bearing, etc.

As illustrated in other figures, such as FIGS. 2C and 2D, the flat region 344 may extend further along the clamping plate 120. For instance, the example implementations in these figures show the clamping plate 120 as a flat sheet. Beneficially, the clamping plate 120 may be flat in a region closest to the magnetic lift member 152 when the flywheel assembly 102 is assembled. For instance, a top and/or bottom surface of the clamping plate 120 may be formed, assembled, or machined to increase flatness. Similarly, the clamping plate 120 may omit any holes, bolts, or other similar structures directly or nearly below the magnetic lift member 152. These features reduce eddy currents induced in the clamping plate 120 (and/or adjacent stacking plates 122) thereby reducing heat generated and energy loss. The clamping plate 120 may be constructed from a metal that is attracted to magnets, such as steel, iron, etc. In some implementations, a composite or other material may be used to keep the magnetic properties but reduce conductivity. Other implementations are possible and contemplated herein.

In some implementations, a flat region 344 of a bottom clamping plate 120 may rest on a shipping ring or device when the flywheel 202 is in a shipping position and be lifted off the shipping ring when in an active position. It should be noted that the top clamping plate 120a and the bottom clamping plate 120b may be the same, or they may be different, such as where the flat portions are sized or shaped to match the shipping ring, magnetic lift assist member 152, or another configuration.

The flat region 344 may have various sizes or configurations. For instance, the flat area 344 may be bounded at a center by a perforation of the axle connection region 342 and may have an outer diameter of various dimensions (e.g., 11 inches). Although various thicknesses of the clamping plate 120 are possible, an example thickness may be approximately one inch (e.g., 0.960 inches) at the flat area/region. For example, in some implementations, most or all of the clamping plate(s) 120 may be flat/a flat region, as noted in reference to FIGS. 4B and 4C.

In some implementations, a clamping plate 120 may have a tapered region 346 between the flat region 344 and an end of a thinner arm 348 that allows the clamping plate 120 to have additional strength near the axle connection 342, the magnetic lift assist area, and/or shipping ring interaction area, for instance, while also having decreased weight and/or increased flexibility nearer the end of the arms/toward an outer radius. The taper may extend partially toward the arms 348, partially into the arms 348, or completely to the end of the arms 348 without departing from the scope of this disclosure. The taper may be positioned away from (e.g., radially outward from) the magnetic lift member 152 to reduce probability that the magnets would directly interact with this region. Similarly, where bolt holes, balancing holes, etc., are disposed in the clamping plate 120, they may be located away from (e.g., not directly under, not within a defined distance) the magnets of the magnetic lift member 152. For instance, these structures may be located as far away as possible while maintaining clamping and radial (e.g., for centrifugal force) strength, as illustrated in the examples of FIGS. 2A, 2C, and 2D.

Where present, the shape, size, and configuration taper/ tapered region 346 may be based on clamping, eddy currents, and/or centrifugal forces. For instance, the taper may be shaped to balance clamping force while reducing radial stresses due to its mass. It may have various sizes, but as an example, it may have an inner radius matching the outer radius of the flat region, an outer radius of 20 inches (e.g., 20.102 inches). Similarly, the tapered region 346 may begin at the flat region and become thinner as it extends radially outward, for example to a thickness of approximately half an inch, although other dimensions are possible. For instance, the example clamping plates 120 in FIGS. 2C and 2D may be thicker than the example of FIG. 2A, such as 1, 2, 3 or more inches thick, which thicker configuration may help maintain flatness, while allowing most of the mass of the flywheel to remain in the stacking plates 122, although other implementations are possible.

In some implementations, the clamping plate 120 may include a plurality of arms 348, which are arranged in a balanced fashion around the axis of rotation (e.g., as in FIGS. 2A and 2C). The arms 348 may be defined by scalloped out material in the clamping plate 120, which may be smoothly contoured about an outer edge to reduce high-stress areas, such as those areas that are not well supported for their mass. The scallops or contours of the arms 348 may have a radius of curvature of around 1.750 inches, although other implementations are possible. The illustrated implementation includes eight arms 348 located equidistantly (e.g., at increments of 45-degree angles) around the clamping plate. These scallops and contours may be used in aligning the clamping plate(s) 120 and/or stacking plates(s) 122.

In some implementations, a clamping plate 120 may include a bolt area 352 that interfaces with a bolt and/or stacking plate 122 (e.g., at 308). For instance, the bolt area 352 may include a flat or contoured area that is sized and shaped to interact with a bolt head or nut or washers (e.g., Belleville™, cone, or spring washers) associated therewith.

In some implementations, an underside of a clamping plate 120 may include one or more recesses for accepting or retaining bushings.

For example, one or more bushings may be located at the bolt area 352 and the point of the arm 348 may be shaped based on the configuration of the bushing(s). For example, where two bushings are located to the sides of a bolt hole, the end of the arm 348 may be substantially flat or squared while where a single pushing is located radially inward or radially outward from the bolt hole, the end of the arm may be rounded.

It should be noted that a clamping plate 120 may have various configurations, as described in further detail above. For instance, while a few example implementations are provided herein, numerous variations are possible. For instance, the clamping plate(s) 120 may use any combination of the components described herein or may vary while performing the features described herein.

Figure 3C:
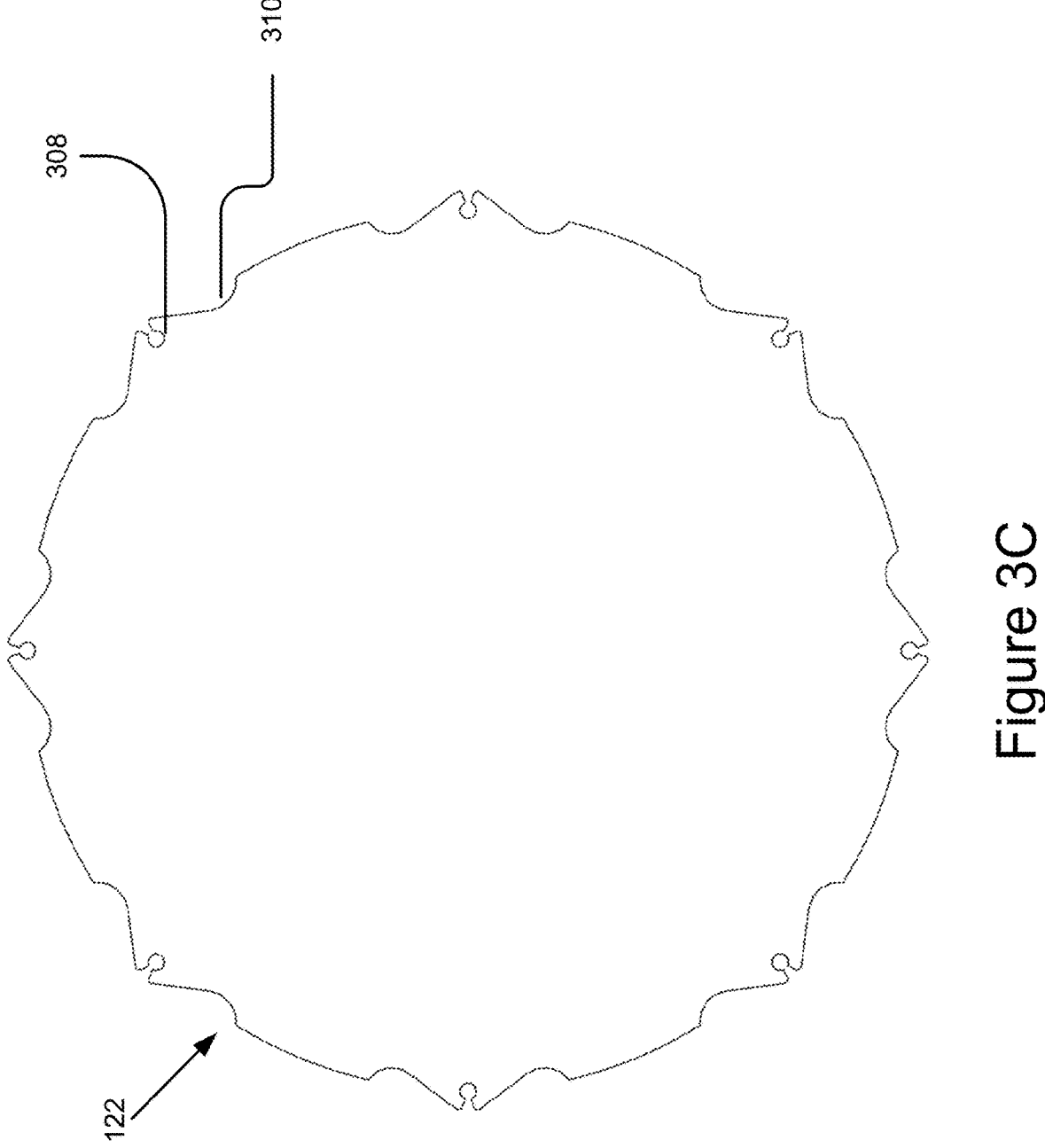
FIG. 3C illustrates an example stacking plate.

FIG. 3C illustrates a top-down view of an example implementation of a flywheel stacking plate 122. The example of FIG. 3A may be used with the example flywheel 202 shown in FIG. 2A, but other implementations, such as those illustrated in FIGS. 2C and 2D, or others, are possible.

The stacking plates 122 may be a flat sheet of metal, such as steel. Although the stacking plates 122 may include contours or perforations (e.g., for bolt holes or, potentially, an axle hole), in some implementations, they are solid plates without perforations (e.g., as in FIGS. 2A and 3C or otherwise), which could increase internal stresses when spinning at high rotations per minute. For example, the stacking plates 122 may be 25 to 35 inches in diameter (e.g., an example implementation may be 27.71, 29.25, etc., inches in diameter), although other sizes are possible. The stacking plates 122 may have various thicknesses, such as $\frac{1}{8}^{th}$ inch to 2 inches. For example, a stacking plate 122 may be 0.25, 0.47, 0.5, etc. inches thick. For example, each stacking plate 122 may have a weight of 20-200 pounds (e.g., 47, 94, etc., pounds). Additionally, any number (e.g., 10, 14, 24, etc.) of stacking plates 122 may be stacked without departing from the scope of this disclosure.

The shape and configuration of the stacking plates 122 may be varied depending on the implementation. For instance, a stacking plate 122 may include a clamping portion 308 or location at or proximate to a peripheral edge at which the stacking plates 122 may be clamped (e.g., in addition to or alternative from clamping at the axle 208). For instance, the illustrated example flywheel stacking plate 122 includes a clamping portion 308/location that is contoured based on a bolt location (e.g., associated with a size/shape of a clamping plate 120).

Although the outer edge of the stacking plate 122, at the clamping location 308, may be flat (or curved based on a radius of curvature of the plate), it may be contoured to increase contact area with a clamping bolt. For instance, where the bolt and/or associated nut has a round top or the bolt couples with the stacking plate 122 via a round washer (as described below), the clamping location 308 may be contoured around the bolt/washer that allow the force and stress to be distributed.

Where the clamping force is applied to the stacking plates 122 via one or more bushings, the clamping location 308 may be contoured based on the force applied by the bushing(s) and to avoid excess stress of the plate(s) at high rotational frequencies. In some implementations, the edge of the stacking plate 122 at the clamping location 308 may extend partially (e.g., as in FIG. 3C) or fully (e.g., as in FIGS. 2C and 2D) around the bolt, so that the bolt passes therethrough. For example, there may be a ½ inch, 1 inch, or other radius (e.g., 0.55 inches, 2 inches, etc.) contour that extends any distance (e.g., a few degrees to nearly 360 degrees) around the bolt in the stacking plate 122. It should be noted that, depending on the implementation, edges of the stacking plates 122 may or may not contact the clamping bolts. For instance, in order to reduce external stress on the bolts (especially where stacking plates 122 may expand outward at high rotational velocities/frequencies), spacing may be left between a bolt and the edge of the stacking plate 122, so that the stacking plate 122 does not put centrifugal force on the bolt. Similarly, where bolts may flex more than the stacking plates 122, a space may be left radially outward of the bolt to allow it to flex without putting additional stress on the stacking plate(s) 122. In other implementations, the stacking plates 122 may be designed to support outward flex of the bolts (e.g., to reinforce weaker bolts or benefit from stronger stacking plates 122).

In some implementations, a stacking plate 122 may include one or more scallops 310 at its peripheral edge that may reduce unsupported regions of the stacking plate 122 that may be more stressed without having sufficient support at high rotational frequencies. For instance, as illustrated in the example of FIG. 3C, the stacking plate 122 may include a scalloped region 310 on both sides of each clamping region. The scalloped region 310 may be gently rounded or contoured to avoid regions of the plate that may be more prone to failure. The scalloped regions 310 may be shaped as partial circles or may have another shape, such as the shape illustrated in the example of FIG. 3C. For example, a finite element analysis may be performed to determine load on various areas of stacking plate 122 (or other flywheel 202 components) in order to determine the shape of the scalloped areas 310, for example, based on the configuration of the clamping locations 308.

In some implementations, between the scallops 310, the flywheel 202 may include non-scalloped areas 310 that may be trimmed during balancing of the flywheel 202 (e.g., as noted below) without jeopardizing the structural stability of the plates.

Using the notches, cutouts, and/or scallops 310, can improve an overall safety factor for the flywheel 202 and/or allow it to operate at higher speeds without material failing or pulling outward; although it should be noted, that the plates may flex at high speeds/loads and the flywheel 202 may be engineered to accommodate for the change in shape, as described below.

In some implementations, the scallops 310 are designed to interact with one or more locations of an assembly fixture or otherwise improve alignment and manufacturability.

In some implementations, the technologies described herein allow a solid plate to be used even without welds, pins extending through the plates, and/or an axle 208 extending through the stacking plates 122. Accordingly, safety and maximum rotational velocity may be increased, depending on the implementation, while avoiding failure modes or balance issues introduced by these other methods, such as where a pin, axle 208, or weld introduces a weakness that may cause a structural failure.

Figure 3D:
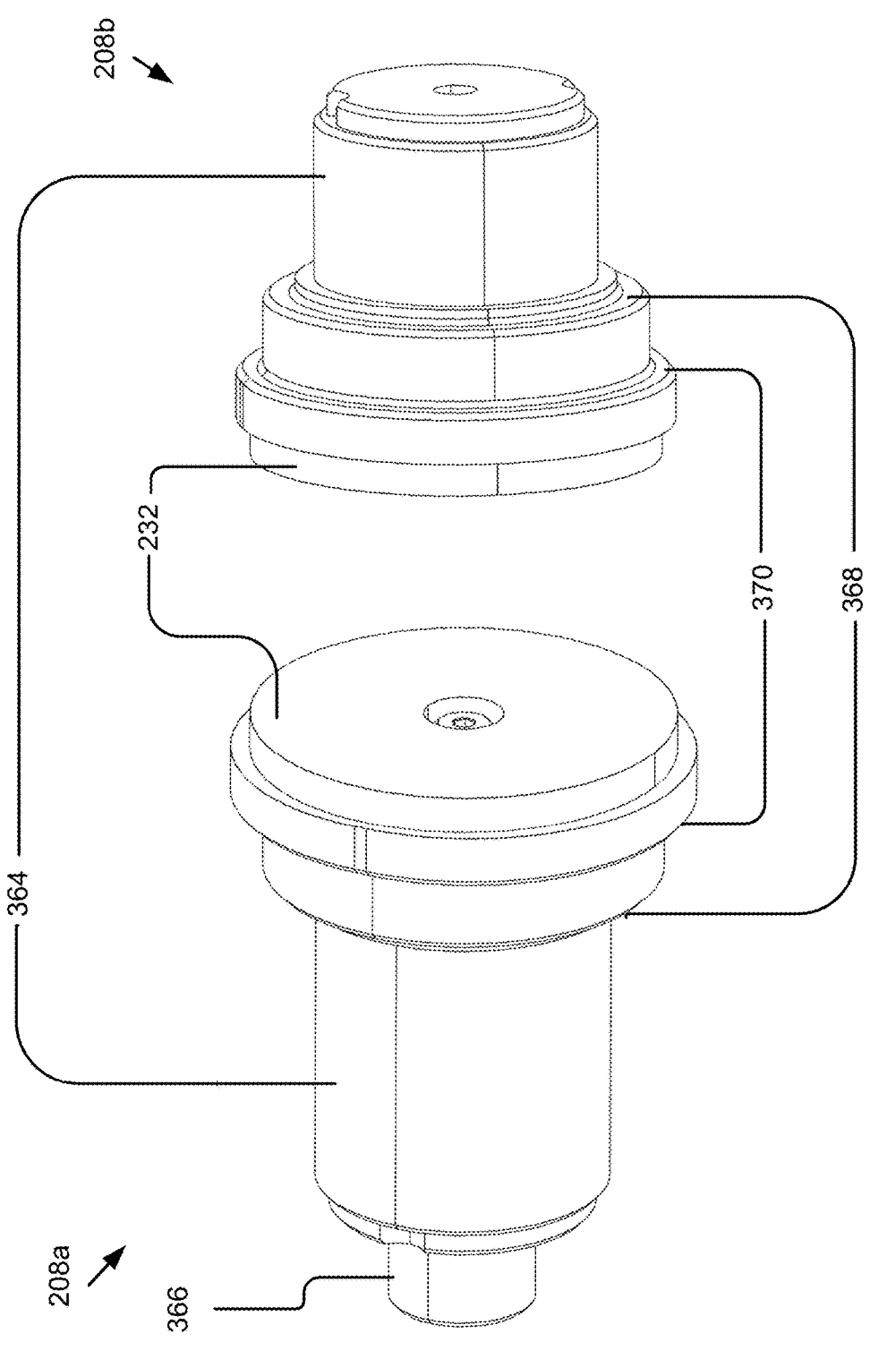
FIG. 3D illustrates example flywheel axles.

FIG. 3D illustrates example flywheel axles 208a and 208b. Although other sizes and configurations are possible, FIG. 3D illustrates a top and bottom axle 208b with axle washers 232 (e.g., ball washers). Depending on the implementation, the top and bottom axles 208b may be identical or have variations, such as their length, whether or not they include washers or axle washers 232, whether they include a motor connection 366. Some features of the axle 208 are described in reference to a single one of the top and bottom axle 208b, but they may be present on both or the other axle 208.

Depending on the implementation, an axle 208 may include a smooth shaft 364 (e.g., a 50-70 mm diameter shaft 364) portion that interacts horizontally with one or more bearings to keep the flywheel 202 aligned. The shaft 364 may contact one or more seals to maintain the vacuum and may be polished to avoid friction with the seals.

An axle 208 may include one or more bearing shelf(ves)/step(s) 368 that interact with bearings to provide vertical support to the flywheel 202 (e.g., to lift, lower, or hold it vertically).

In some implementations, an axle 208 may include one or more clamping shelf(ves)/step(s) 370 that interact with a clamping plate 120. For instance, the clamping step 370 could be a wider area than the shaft 364 so that the clamping plate 120 applies pressure on the clamping step 370 to hold the axle 208. In some implementations, the axle 208 extends beyond the clamping step 370 and flywheel step 368, so that the axle 208 applies pressure to a stacking plate 122, as noted above. The contact with a stacking plate 122 may be via a washer, such as an axle washer 232 (which may be a flat or ball washer). The clamping step 370 may interact with an edge or corresponding step(s) on a clamping plate 120.

In some implementations, the clamping step 370, an axle washer 232, or another part of the axle 208 may be shaped to interact with a corresponding shape or structure in a clamping plate 120. For instance, it may include a flat side, oval shape, protrusion, or other structure that allows torque to be transferred between the axle 208 and the clamping plate 120 and/or stacking plates 122 (e.g., where a top or bottom stacking plate 122 includes a shape to match this structure). For example, as noted in further detail above, an oval or small flat side may be used to avoid stress risers in the material (e.g., of the clamping plate 120).

In some implementations, one or both of the axles 208 may include a motor connection 366 that may be a portion or extension of the shaft 364. The motor connection 366 may include a flat, oval, D-shaped, or other structure/shape (e.g., a key or slot) that allows torque to be transferred between the axle 208 and another structure, such as a motor-generator 110 (e.g., via a magnetic coupling 118, as described elsewhere herein). The motor connection 366 may additionally or alternatively include keys or other protrusions that improve the connection between the axle 208 and another structure (e.g., the magnetic coupling 118, motor-generator 110, etc.).

Although a ball washer (at 232) is illustrated on both the top and bottom axle 208a and 208b in FIG. 3D (also shown in FIG. 2B), other implementations are possible and contemplated. For example, a ball washer may be used to provide a small amount of adjustability to the axle 208 alignment when top axle 208a, bottom axle 208b, stacking plates 122, and clamping plates 120 are aligned. As illustrated in the example, two axles 208 may be used where the axles 208 are physically disconnected from each other.

In some implementations, a ball washer may be flat on its bottom where it contacts a stacking plate 122 while it is rounded on a top where it contacts a corresponding curve in the axle body. Accordingly, the position of the axles 208 could be shifted slightly during assembly to allow the axles 208 to be positioned. As illustrated, in some implementations, a bolt may couple the axle washer 232 to the axle body in order to hold it in place during assembly.

It should be noted that, in some implementations, flat washers or no washers are used with an axle 208.

Figure 4A:
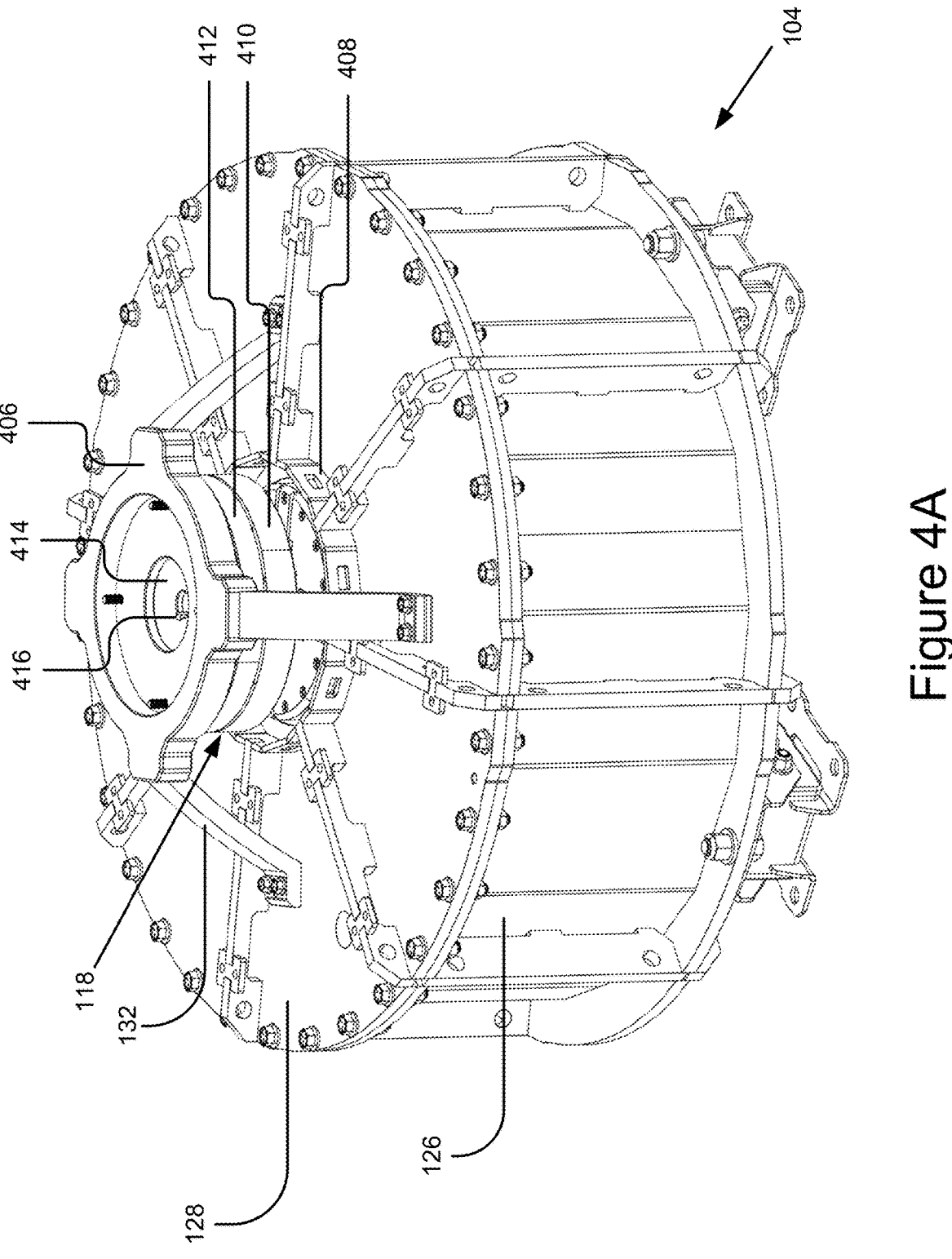
FIGS. 4A, 4B, and 4C illustrate views of an example flywheel assembly with various components omitted for illustration.

FIG. 4A illustrates an example flywheel enclosure 104 with a motor mount, magnetic coupling 118, and other features coupled therewith. For instance, various components, such as the motor-generator 110, CPU, vacuum 108, and mounting plates 130 are removed to expose the underlying structure. As illustrated in the example, four motor mount braces 132 are coupled to a top plate (e.g., part of a lid 128) of an enclosure 104 and extend upward to provide rigid support to a motor mount base 406. The motor mount base 406 may be round or any other shape to accommodate various components, such as the motor-generator 110, magnetic coupling 118, bearing(s), axle(s) 208, etc. For instance, the motor mount base 406 may be rounded at a top to receive and mount (e.g., using fasteners, such as bolts) the motor-generator 110, have a perforation through which a flywheel axle 208 and/or motor axle, etc., may pass, and or may allow various other components to be coupled or mounted thereto. For instance, a magnetic coupling 118 may be mounted to or integrated with the motor mount base 406, so that it can easily be attached to the enclosure 104.

As depicted in the example, the motor mount braces 132 and base 406 may be configured to be lifted above, accommodate, and/or hold other components. For instance, a motor coupling, such as the illustrated example magnetic coupling 118 may be coupled to a bottom side of the motor mount base 406 to interact with both a top axle 208a and a motor-generator 110. Similarly, this positioning (e.g., as illustrated in FIGS. 1A, 1C, and 4A) may allow top bearing (s) to be installed or maintained under the braces/base. Similarly, as noted elsewhere herein, reinforcing components or structures of the flywheel assembly 102 may support the motor, prevent undesired twisting of components, and hold a bearing and/or magnetic lift member 152.

FIG. 4A also illustrates various assembled structures of the flywheel enclosure, which may include a lid 128 and a tub 126. The lid 128, as described in further detail below, may include a top plate, top rib(s), motor mount brace(s) 132, mounting plates, and various other structures. For instance, a top ring 408 may include a ring of material (e.g., a steel ring or set of bends in steel plates) may be disposed surrounding an axle 208a/axis of rotation to provide torsional rigidity to the enclosure 104 and/or to top ribs, which may radiate outward from the top ring and provide strength to the lid 128, which may support motor mount brace(s) 132, mounting plate(s), a vacuum 108, etc., and may prevent the top plate from buckling when force is placed thereon. The top ring 408, top rib(s), top plate, and/or other structures may work together to support air pressure due to an internal vacuum and/or the weight of the flywheel 202. For instance, a magnetic lift mechanism 152 may be coupled to the lid 128 (e.g., at a center near the axle 208a) to lift some or all of the weight of the flywheel, so the strength of the lid 128 is particularly beneficial. Depending on the implementation, the lid 128 may be constructed of one quarter to one half inch steel plate, or a thicker construction (e.g., as in the example of FIG. 1C), which may be flat, welded together, and/or have various bends to further increase rigidity. For instance, the top ring 408 and top ribs may include one or more longitudinal bends to increase their strength and the ability to mount components thereto.

The enclosure tub 126, as described in further detail below, may include one or more side walls that encircle the flywheel 202, which may be a continuous ring of material or bent metal (e.g., steel) or other plates that are welded together. The side walls may provide vertical strength to the enclosure while also mitigating mechanical failure of the flywheel 202. Side ribs (e.g., steel plates welded to the side walls, such as the top ribs) may also be attached around the side wall, as illustrated, to provide further strength and avoid buckling inward or outward. The side ribs and/or side walls may be coupled (e.g., welded, glued, bolted, etc.) with a wall ring to which a lid may be bolted, as described below, and with a bottom plate (which may have structures, such as bottom ribs, as described below).

For instance, a magnetic coupling 118 is shown in the example of FIG. 4A. The magnetic coupling 118 may couple the flywheel axle 208 (e.g., 208a) with an axle or rotor of the motor-generator 110. The magnetic coupling 118 may be supported by a motor mount base 406, top ring 408, or other components of the flywheel assembly 102 to hold it above an axle 208. The magnetic coupling 118 may include an external rotor bottom 410 and external rotor top 412, which may house an internal arrangement of magnets and/or bearings, etc., as described in further detail below. The magnetic coupling 118 may include an internal rotor top 414 with a rounded machine key 416 that interacts with a corresponding slot in an axle and/or rotor of the motor-generator 110 to improve the strength of the mechanical connection between these components. A similar structure may additionally or alternatively be used with an axle 208a. The magnetic coupling 118 is described in further detail below.

Figure 4B:
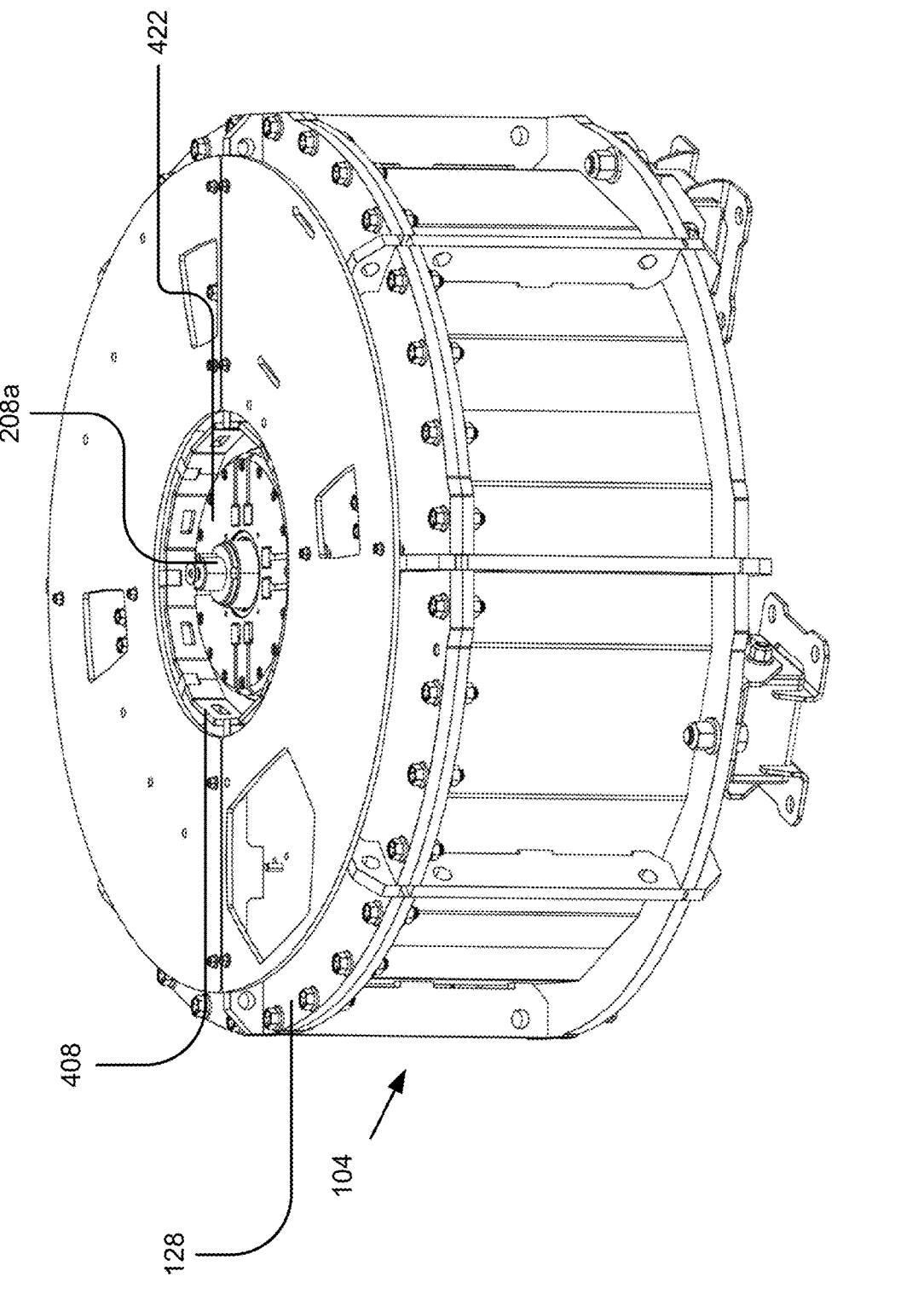

FIG. 4B illustrates an example flywheel enclosure with a magnetic coupling 118 and other components removed. As illustrated in the figure, a top axle 208a of a flywheel 202 is passing through an upper bearing and O-ring housing 422, which may hold one or more bearings (e.g., for holding the top axle 208a vertically or horizontally. In some instances, the bearings and/or housing 422 may include O-ring seals that help maintain the vacuum internal to the enclosure 104, as described in further detail elsewhere herein. The O-ring or other seals may create an airtight seal between an inside and an outside of the enclosure 104.

The housing 422 may be removable and/or installable in its entirety or seals or bearings may be replaced separately (e.g., through a gap in the brace(s) 132) for installation or maintenance of these components. In some implementations, the housing 422 may sit fully or partially on top of the lid 128. While these components are housed in a single housing 422, they may alternatively be separate or in separate housings. Additionally, while the housing 422 is illustrated as extending nearly to the ring 408, it may be sized, shaped, or configured differently, as illustrated elsewhere, such as in FIG. 1C.

Figure 4C:
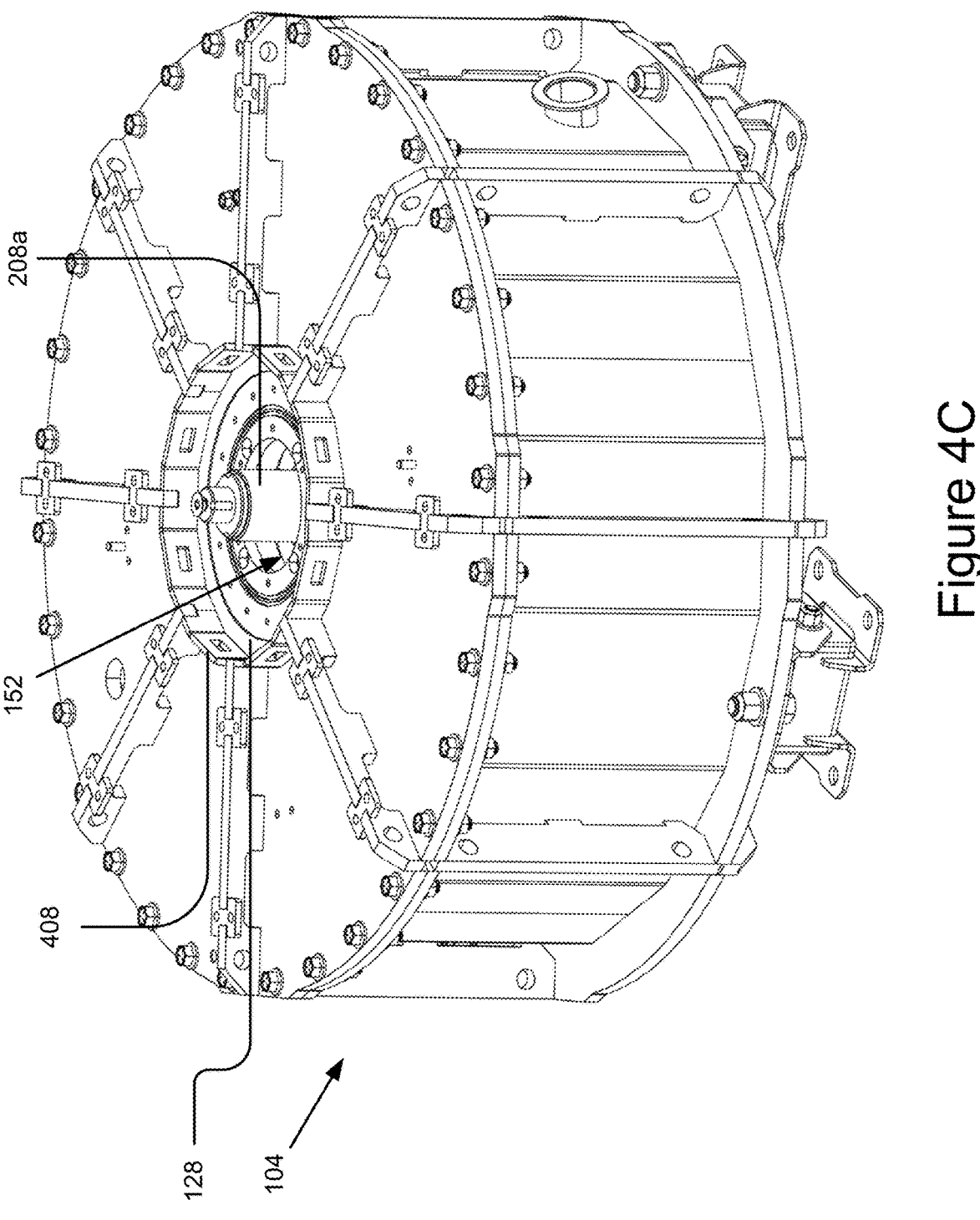

FIG. 4C illustrates an example flywheel enclosure 104 with an upper bearing and O-ring housing 422 (or portion thereof) removed. As illustrated, a top component of the magnetic lift member 152 may surround the top axle 208a of the flywheel 202 to interact with the top clamping plate 120a (not visible in FIG. 4C) or another component of the flywheel 202. The magnetic lift member 152 may be coupled (e.g., welded, bolted, etc.) to the top plate of the lid 128, top reinforcement ring 408, and/or other components of the enclosure 104 or flywheel assembly 102. For example, the magnetic lift member 152 may be coupled with a bottom side of the top plate of the lid 128 to be in close proximity to the top clamping plate 120a of the flywheel 202, as described elsewhere herein.

It should be noted that although the magnetic lift member 152, top reinforcement ring 408, bearing housing 422, and magnetic coupling 118, etc., are illustrated as separate components with spacing between them, they may be positioned more closely or may be integrated as a single or fewer separate components. For instance, a magnetic lift member 152 or magnetic coupling 118 may also include O-rings, or a bearing housing 422 and magnetic coupling 118 may be integrated.

Figure 4D:
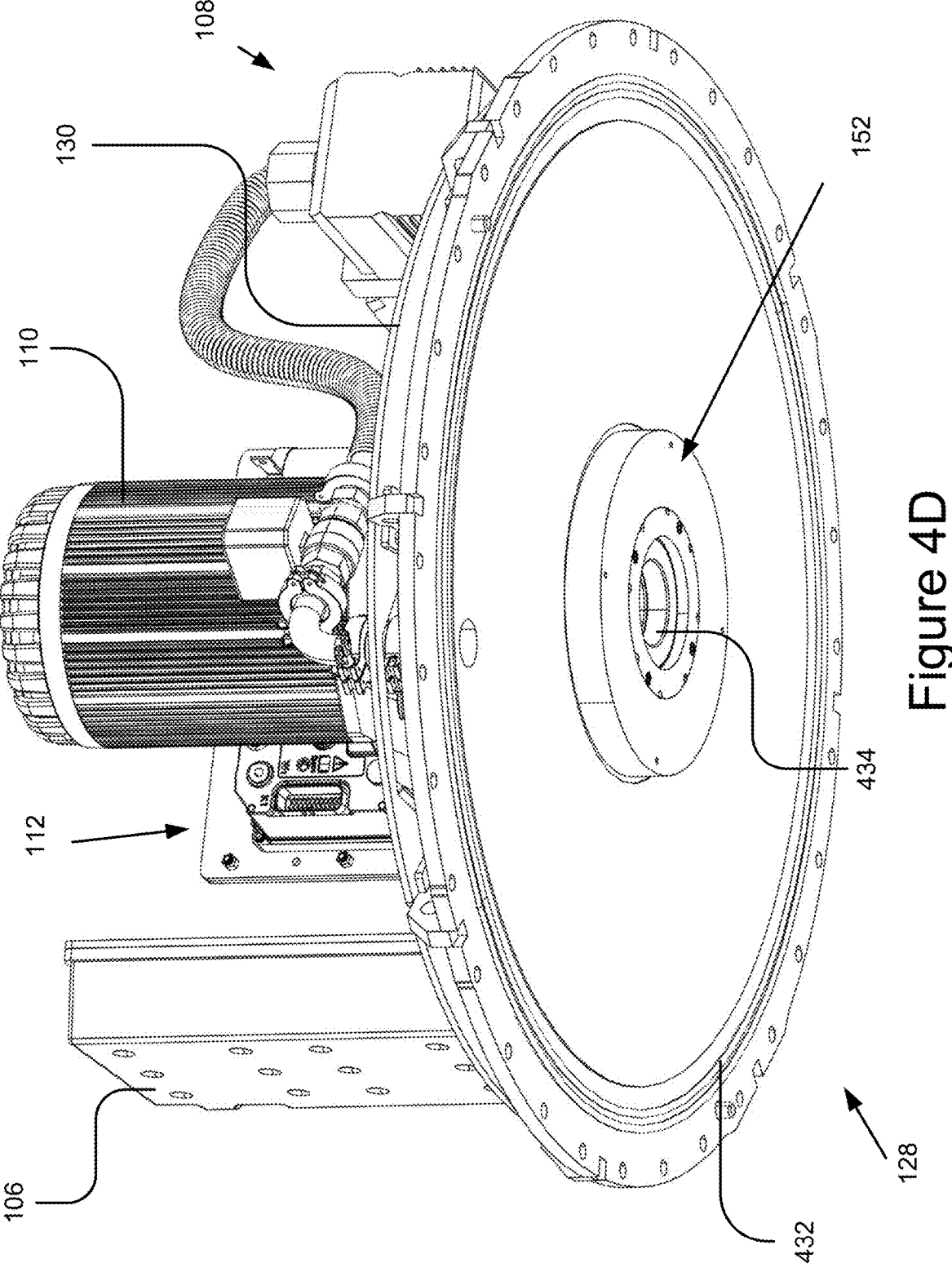
FIG. 4D illustrates an example enclosure lid with various components attached thereto.

FIG. 4D illustrates an example enclosure lid 128 with various components attached thereto. For instance, the enclosure lid 128 may be placed onto an enclosure tub 126 (not shown in FIG. 4A) to form an enclosure 104, which may be vacuum sealed, depending on the implementation. As illustrated in the example, a lid 128 may include a top plate with reinforcing top ribs that extend radially from an axle 208a (e.g., from a top reinforcing ring 408) to an outer edge of the plate. In some instances, the top ribs may extend beyond the top plate or into cuts in the top plate. For example, the top rib(s) may extend partially (e.g., at an end) into slots formed in the top plate to further enhance rigidity and ease manufacturability. Other configurations of a lid 128 are also possible, such as the example implementation of FIG. 1C.

The lid 128 may also include O-rings, O-ring grooves/channels 432, or other seal locations around a periphery of the top plate, center perforation (e.g., in association with a top bearing assembly or other components), and other features for sealing the enclosure 104 when the lid 128 is attached to the enclosure tub 126 (e.g., by bolts around the peripheral edge). In some instances, the lid 128 or other components may include a whole, seal, valve, etc., through which a vacuum 108 may be attached in order to actively establish or maintain a vacuum. For example, as noted above, a vacuum assembly 108 may be mounted to a lid 128 assembly mounting plate or otherwise, depending on the implementation.

In some implementations, the lid 128 may also include a motor 110 mounted thereto, along with other components, such as a driver, controller/CPU 112, supercapacitor 106, etc. As these and other components may be previously assembled on the lid 128 and then placed onto the enclosure tub 126 (e.g., where a flywheel 202 is already positioned in the tub 126), which may improve the speed and ease of assembly.

In some implementations, the lid 128 may include a perforation at an axis of rotation of the flywheel for receiving an axle 208a of the flywheel 202, although other implementations are possible, such as where a top axle 208a interacts with a magnetic coupling 118 integrated with the lid 128. For instance, the magnetic coupling 118 may be sealed and/or placed at a center of the lid 128 and may interact with the top clamping plate 120a to provide interaction between the flywheel 202 and the motor 110.

In some implementations, the axle 208a may pass through the perforation, which may include or be coupled with one or more bearing(s) 434 that support the axle 208a horizontally and/or vertically (e.g., holding the flywheel downward from contacting magnets in the magnetic lift member 152). One or more magnets, such as in a magnetic lift assist member 152/mechanism may be attached to the lid 128.

A magnetic lift member 152 may extend downward from the bearing(s) 434 or other components to bring it into proximity with the top clamping plate 120a and/or stacking plates 122 of the flywheel 202, which may increase the efficiency of the magnets. Although the magnetic lift member 152 is illustrated as being a continuous ring, multiple individual magnets may be included (e.g., in a balanced manner) around the axis of rotation of the flywheel 202 (e.g., inside a housing of the magnetic lift member 152). In some implementations, the height of the magnetic lift member 152 and/or its magnets may be adjustable by tightening or loosening bolts coupling the magnetic lift member 152 to the lid 128, for example, from underneath the lid 128 or on top of the lid 128 (e.g., when the lid 128 is on top of the enclosure tub 126). Accordingly, a position (and, by extension, strength) of the magnets may be adjustable to further balance the system and force on the bearings 434.

Figure 5A:
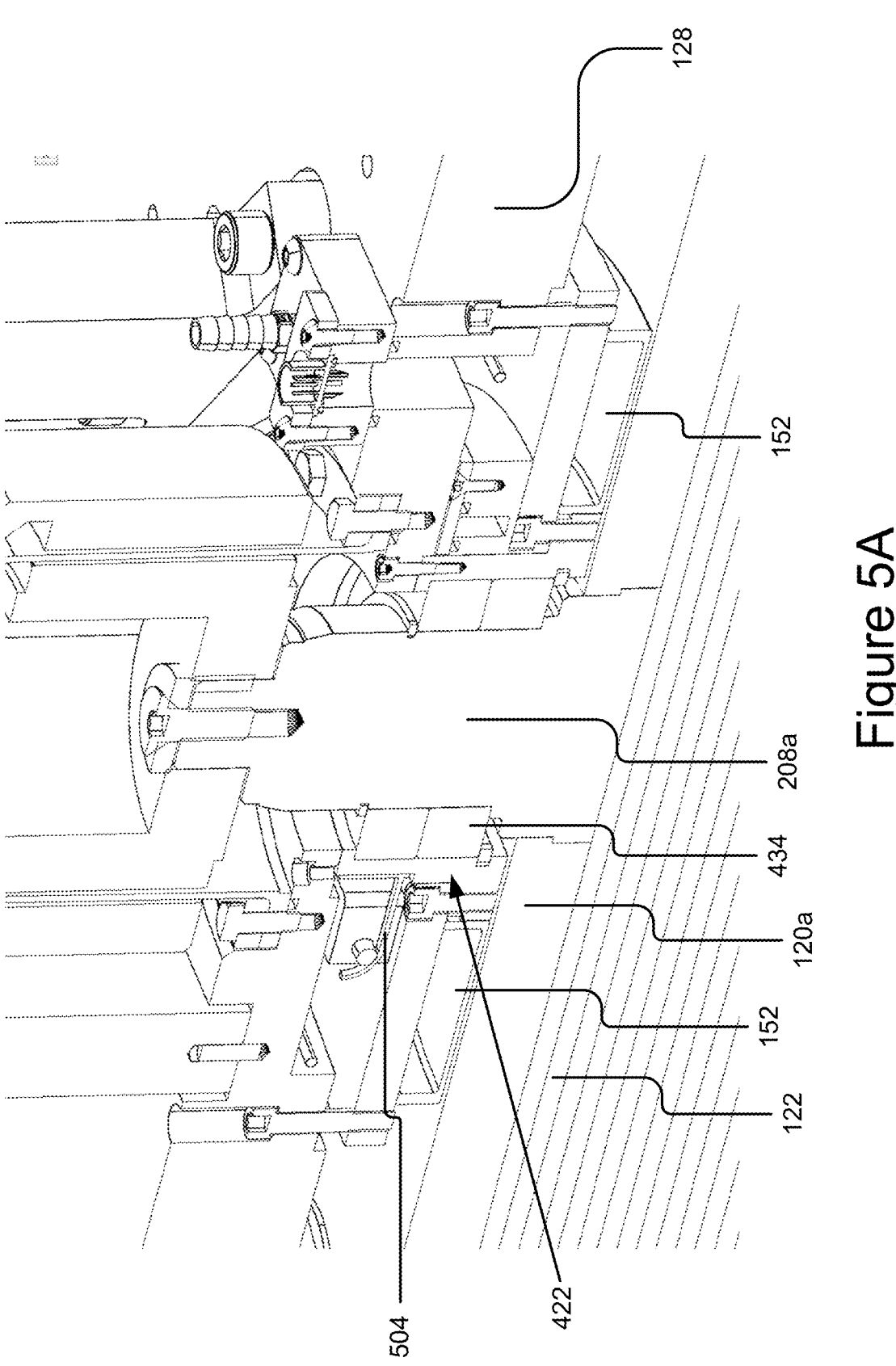
FIG. 5A illustrates a cross-sectional view of an example upper axle disposed within an upper bearing assembly.

FIG. 5A illustrates a cross-sectional view of an example upper axle 208a disposed within an upper bearing assembly of a flywheel enclosure 104. In the illustrated example, some components may be omitted for visibility. As illustrated, a top axle 208a may interact with a plurality of bearings 434 and/or seals (e.g., in a housing 422) to provide vertical and/or horizontal support. For instance, multiple (e.g., 2) bearings 434 may be used on an axle 208 to increase redundancy and safety. In some instances, a temperature sensor 504 or accelerometer may be located in or adjacent to the bearing housing 422, which allows the flywheel 202 to detect a failure of one or more bearings 434 thereby increasing a safety margin. Other features, such as cooling loops (e.g., through which coolant may be circulated), vacuum connections, etc., may also be used.

As illustrated, one or multiple seals may be located in or adjacent to the shaft of the axle. For instance, the seals may be housed within a bearing/O-ring housing 422 and contact the smooth sides of the axle shaft to seal a vacuum. In some instances, where the vacuum is actively established or maintained, the seals may change their shape by flexing inward to improve the seal. Similarly, the seals may be multiplied (e.g., doubled) for redundancy. Other structures, such as retaining clips may be located on one or both sides of the bearings 434, so that they can be installed or replaced separately or with a housing 422.

In some implementations, the bearings and/or seals/shaft may be lubricated, for example, using a high durability and/or vacuum specific lubricant. In some implementations, a special material may be used for the seals to allow them to be used in a vacuum and/or without a separate lubricant. Depending on the implementation, the bearings may be dry bearings, such as a ceramic hybrid bearing, which beneficially reduces eddy currents and other issues due to moving in a magnetic field. Additionally, or alternatively, a dry film lubricant may be used for these components.

In some implementations, as illustrated, an example magnetic lift member 152 may interact with (e.g., to attract) a flywheel 202, such as a top clamping plate 120a (and/or stacking plates 122). For instance, as illustrated, the magnet (s) of a magnetic lift member 152 may be located above, below, or next to the center of the axle 208a. For example, the magnets may be positioned by the magnetic lift member 152 (also referred to as the magnetic lift assist member/mechanism 152) to closely interact with the flat area (e.g., 444) of the top clamping plate 120a. For instance, the top bearing 434 may hold the top clamping plate 120a/flywheel 202 at a defined distance from the magnetic lift member 152, so that a defined magnetic force is applied, which lifts the flywheel 202 wholly or partially. For instance, as described elsewhere herein, the magnetic lift may be less than (e.g., so that weight remains on a bottom bearing), equal to (e.g., so that weight is roughly balanced between the top and bottom bearings), or greater than (e.g., so that the top bearing is holding the flywheel 202 from being pulled closer to the magnet(s)) the weight of the flywheel 202 at the set distance.

As illustrated and described in further detail below, the magnetic lift member 152 may be positioned close to the clamping plate 120a, which may be ferromagnetic (e.g., a magnetic steel) flat (or matching the shape of the magnetic lift member) shape. As shown, the flywheel 202 may be positioned at a center of the enclosure 104, although other implementations are possible. As noted elsewhere herein, the magnets of the magnetic lift mechanism 152/member may be stationary and coupled with the enclosure because magnets tend to be made out of weaker material that would not hold up well to rapid spinning (e.g., because rare-earth magnets, for instance, are mechanically weak). In the depicted example in FIG. 5A, a cavity is shown in the magnetic lift member 152, but this cavity may include one or more magnets, as described below. The magnetic lift member 152 may be assembled as a unit and then bolted or otherwise attached to a lid 128 of the flywheel assembly 102.

In the depicted example, an upper axle 208a may be coupled to a motor directly or via a magnetic coupling 118, as described elsewhere herein.

Figure 5B:
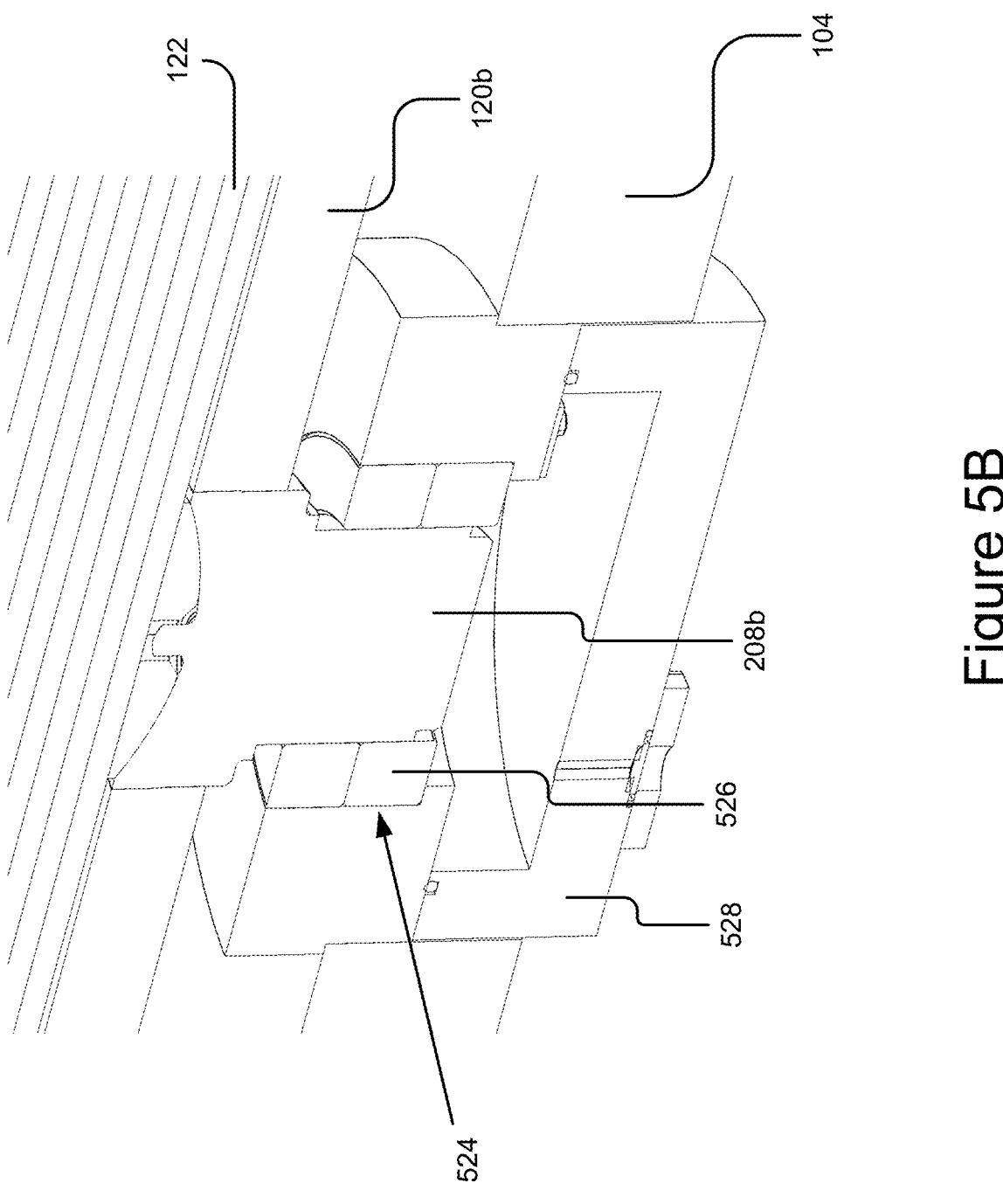
FIG. 5B illustrates a cross-sectional view of an example lower axle disposed within a lower bearing assembly.

FIG. 5B illustrates a cross-sectional view of an example lower axle 208b disposed within a lower bearing assembly 524 of a flywheel enclosure 104. In the illustrated example, some components may be omitted for visibility. Similar to FIG. 5A, as illustrated, a bottom axle 208b may interact with a plurality of bearings 526 and/or seals or structures to provide vertical and/or horizontal support. For instance, multiple (e.g., 2) bearing assemblies may be used on an axle 208b to increase redundancy and safety. In some instances, a temperature sensor or accelerometer may be located in or adjacent to the bearing housing 524, which allows the flywheel 202 to detect a failure of a bearing thereby increasing a safety margin, improving efficiency, etc. Stacking plates 122 are also shown.

As shown in the example of 7B, a cap 528 is also shown. The cap 528 may seal (e.g., using gaskets and bolts) an interior cavity of the enclosure 104. The cap 528 may provide access to move the flywheel 202 within the enclosure 104; install, maintain, or adjust bearings 526 and seals; and perform other actions.

In some implementations, the cap 528 and/or another component may be threaded, so that it may be twisted up/down, which adjusts the position of the bearings 526 and/or seals; or it may lift the flywheel 202 itself to set its position in the enclosure 104. In other implementations, the flywheel 202 may be manually adjusted (e.g., to be at a defined distance from the magnetic lift member 152) and then the FIG. 5C illustrates an example flywheel 202 coupled with a portion of a magnetic lift member 152 and a lower bearing assembly outside of a flywheel enclosure 104, for example, for purposes of illustration.

Figure 5C:
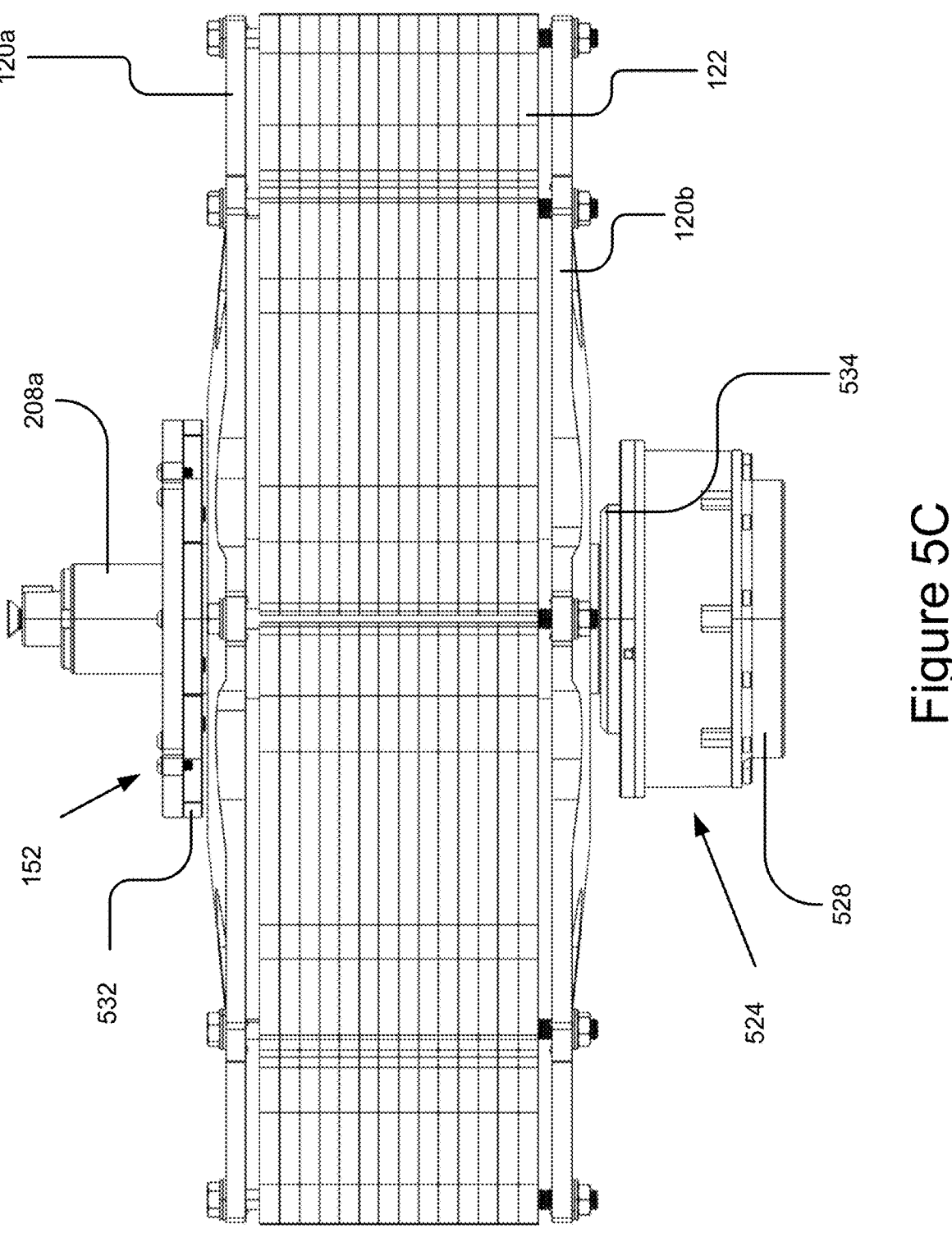
FIG. 5C illustrates an example flywheel coupled with a portion of a magnetic lift member.

As illustrated in the example of FIG. 5C, an exterior of the magnetic lift member 152 has been omitted to show magnets 532, which may be wedge magnets, and an example relative proximity to the top clamping plate 120a. For instance, the wedge magnets 532 may, when in an active configuration, pull on the flat area (e.g., 444) of the clamping plate 120a, although other implementations are possible and contemplated. It should be noted that although the magnets 532 and other components of the magnetic lift member 152 are illustrated floating above the top clamping plate 120a (e.g., instead of attached to an enclosure 104/lid 128) for purposes of illustration.

The example of FIG. 5C also illustrates a lower bearing assembly 524 that holds one or more bearings at the bottom of the flywheel enclosure 104. For instance, a lower bearing assembly 524 may be welded, integrated with, or bolted to an enclosure tub 126. The lower bearing 524 may support none, a portion, or all of the weight of the flywheel 202. In some implementations, the lower bearing 524 may merely be present to keep the flywheel 202 horizontally aligned.

The lower bearing 524 may include a shipping support area 534, such as a shipping ring, on which the weight of the flywheel 202 may rest during shipping, storage, or when not in use. The shipping support area 534 may be any device that may support the flywheel 202, such as a plastic or metal ring in the enclosure tub 126.

The height and/or relative positioning of the bearings may also be adjusted because a quantity (e.g., 10, 14, 18, 28, or other quantities) of stacking plates 122 may vary, and thicknesses of each plate may vary (e.g., by a thousandth of an inch), the overall thickness of the flywheel 202 may vary enough to affect the functioning or longevity of the bearings unless there is flexibility in the design, as illustrated, to accommodate different heights.

As described elsewhere herein, a retaining cap 528 or another mechanism may seal the enclosure and/or capture an adjustment nut so that it does not accidentally move in order to lock the Z/vertical axis of the flywheel 202.

Figure 6A:
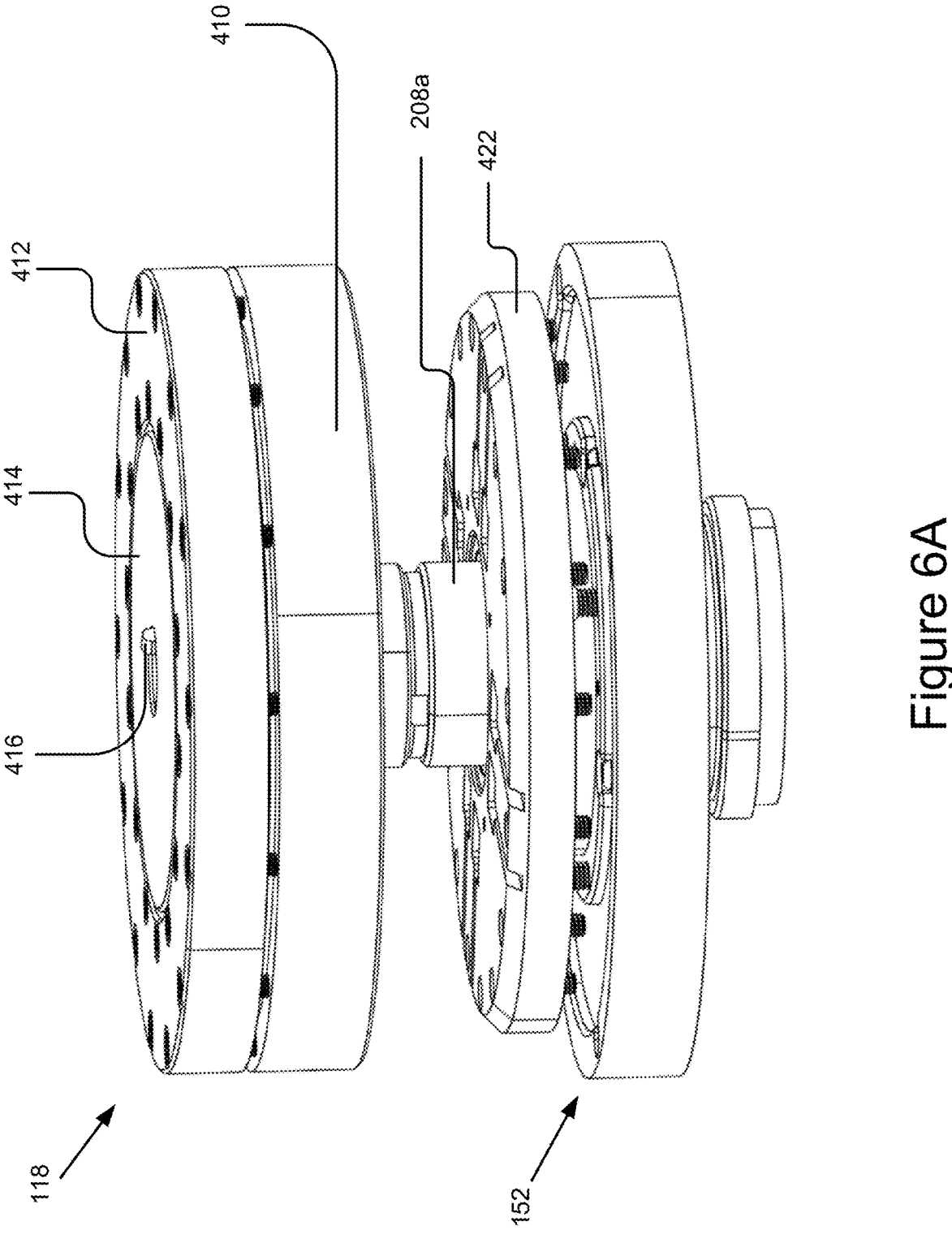
FIG. 6A illustrates an example upper bearing, magnetic motor coupling, and magnetic lift member.

FIG. 6A illustrates an example assembly for an upper bearing of a flywheel assembly 102 including a magnetic motor coupling 118, top axle 208a, upper bearing seal/O-ring housing 422, and magnetic lift member 152. It should be noted that although these components are illustrated as being separate, they may be combined or further separated. For instance, a bearing housing 422 may be combined with the magnetic lift member 152 and/or the magnetic coupling 118.

As illustrated in the example of FIG. 6A, the top axle may pass through a magnetic lift member 152, and which may be a ring coupled to the lid of the flywheel enclosure 104 (e.g., to an underside thereof). For instance, the magnetic lift member 152 may be positioned at the bottom-most point of the upper bearing assembly in order to be as close as possible to the flywheel 202 (e.g., to the top clamping plate 120a) to maximize the magnetic pull. For instance, where a flywheel 202 weighs 1800 pounds, at a defined distance, the magnetic lift member 152 may pull with a force of 1500 pounds, so that a bottom bearing only holds 300 pounds. In another configuration, where a flywheel weighs 1800 pounds, the magnetic lift member may pull with a force of 2100 pounds, so that the top bearing holds 300 pounds pushing upwards.

The upper bearing O-ring housing 422 may hold one or more seals and/or one or more bearings 434 (not visible in FIG. 6A). For instance, the bearings 434 and seals may interact with the top axle 208a. The bearings are described elsewhere herein and may prevent the top axle 208a from moving upwards (e.g., due to the magnetic lift member 152) and/or may keep the axle 208a from wobbling around an axis. The bearings 434 may be doubled for redundancy, as noted above. In some instances, the upper bearing O-ring housing 422 may also include one or more sensors that detect issues with the bearing(s).

The upper bearings 434 may be oriented to reduce friction and/or provide support horizontally and/or vertically. Although the bearings 434 may be doubled to tripled for redundancy, minimal pressure should be applied to the bearings by balancing the flywheel 202 and/or using support mechanisms, such as the magnetic lift member 152. The bearing(s) 434 may be ceramic/ceramic hybrid bearings and/or could use dry film lubricant.

The upper bearing O-ring housing 422 may additionally or alternatively house one or multiple seals that interact with a shaft of the top axle 208a, and/or seals may be incorporated with bearing(s) 434, as noted above. In some instances, the seals may be integrated with another component, such as a motor-generator housing, magnetic lift member 152, enclosure lid 128, and/or otherwise.

The upper bearing O-ring housing 422 may be coupled to a top of the enclosure lid 128, to the top of the magnetic lift member 152, to the bottom of the magnetic coupling 118, or to another component of the flywheel assembly 102.

The magnetic coupling 118 may be located near the motor-generator 110, for example, near an end of the top axle 208a in order to interact with the top axle 208a. As described elsewhere herein, the magnetic coupling 118 may interact with the shape, groove, machine key 416, or other components of the top axle 208a to transfer torque to/from it.

Example implementations of the magnetic coupling 118 are described below and may include various components, such as an external rotor top 412 and bottom 410, as well as an internal rotor top 414 and bottom (not visible) that may rotate within the external rotor top 412 and/or bottom 410. For instance, the external rotor top 412 and/or bottom 410 may be coupled (e.g., bolted) to a motor mount, upper bearing O-ring housing 422, enclosure lid 128, or otherwise, as described elsewhere herein.

Figure 6B:
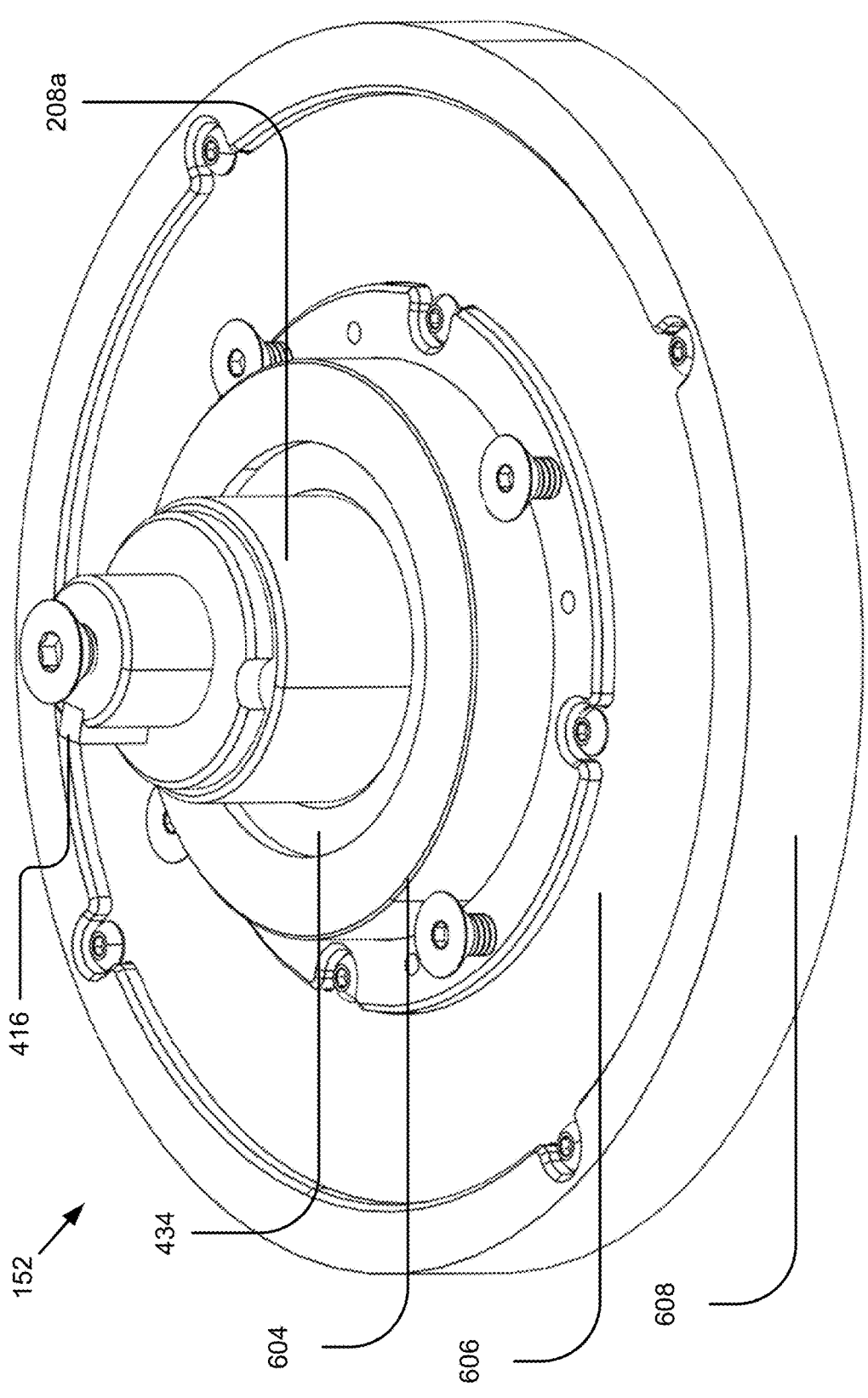
FIG. 6B illustrates a top view of an example magnetic lift member.

FIG. 6B illustrates a top view of an example magnetic lift member 152. As illustrated, a top axle 208a may pass through the magnetic lift member 152, which may interact with the axle 208a and/or the flywheel 202 (e.g., via a top clamping plate 120a—not visible in FIG. 6B). As noted above, the magnetic lift member 152 may support less than, equal to, or greater than the weight of the flywheel 202.

As illustrated in FIG. 6B, the top axle 208a may include a machine key 416 that improves the connection with the magnetic coupling 118 (not visible in FIG. 6B).

As illustrated in the example, the bearings 434 may be held at the center of the magnetic lift member 152, for example, by an upper bearing holder 604. The upper bearing holder 604 may be held by the magnetic lift member 152, the upper-bearing O-ring housing 422, an enclosure lid 128, etc. For example, the upper bearing holder 604 may be located within or above a ring of the magnetic lift member 152. The magnetic lift member 152 may be bolted to the bottom of the enclosure lid 128 (e.g., using the illustrated bolts).

Depending on the implementation, the magnetic lift member 152 may include a mag lev backer 606 (also referred to as a backer ring) to which magnets may be attached or otherwise supported, as described below. In some implementations, the magnetic lift member 152 may additionally or alternatively include a magnet holder 608 that may couple with the mag lev backer 606 and/or magnets. For instance, the magnet holder 608 may be a cap or structure that overlaps over the bottom of the magnets to help support them and/or is bolted to a mag lev backer 606.

Figure 6C:
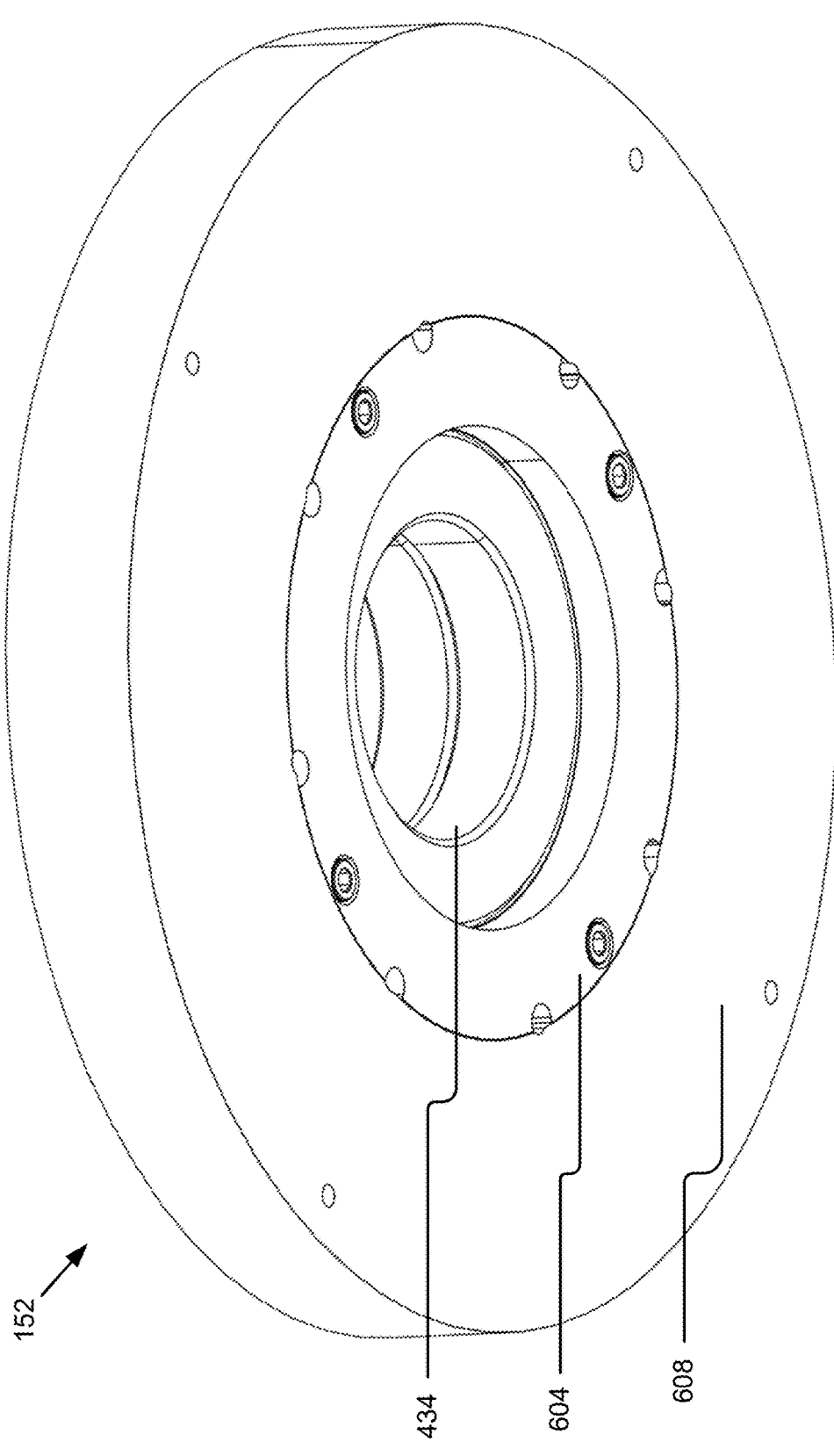
FIG. 6C illustrates a bottom view of an example magnetic lift member.

FIG. 6C illustrates a bottom view of an example magnetic lift member 152. As illustrated, the magnet holder 608 may extend under the magnets to protect them and/or hold them to the mag lev backer 606 or another component. In the illustrated example, an upper bearing holder 604 may be coupled (e.g., bolted or welded) to the magnetic lift member 152 and may provide horizontal and/or vertical support to the bearing(s) 434. The mag lev backer 606 may be a flat plate or disk with bolt holes to which the magnet holder 608 may attach. Similarly, the mag level backer 606 may bolt to a lid 128 of an enclosure 104 (not shown in FIG. 6C). The magnet holder 608 may support the magnets or merely cover them, although other implementations are possible. The magnet holder 608 and mag lev backer 606 may be circular, have protrusions (e.g., for bolts), or have other shapes. Similarly, these components may be bolted at a center, periphery or otherwise supported.

Figure 6D:
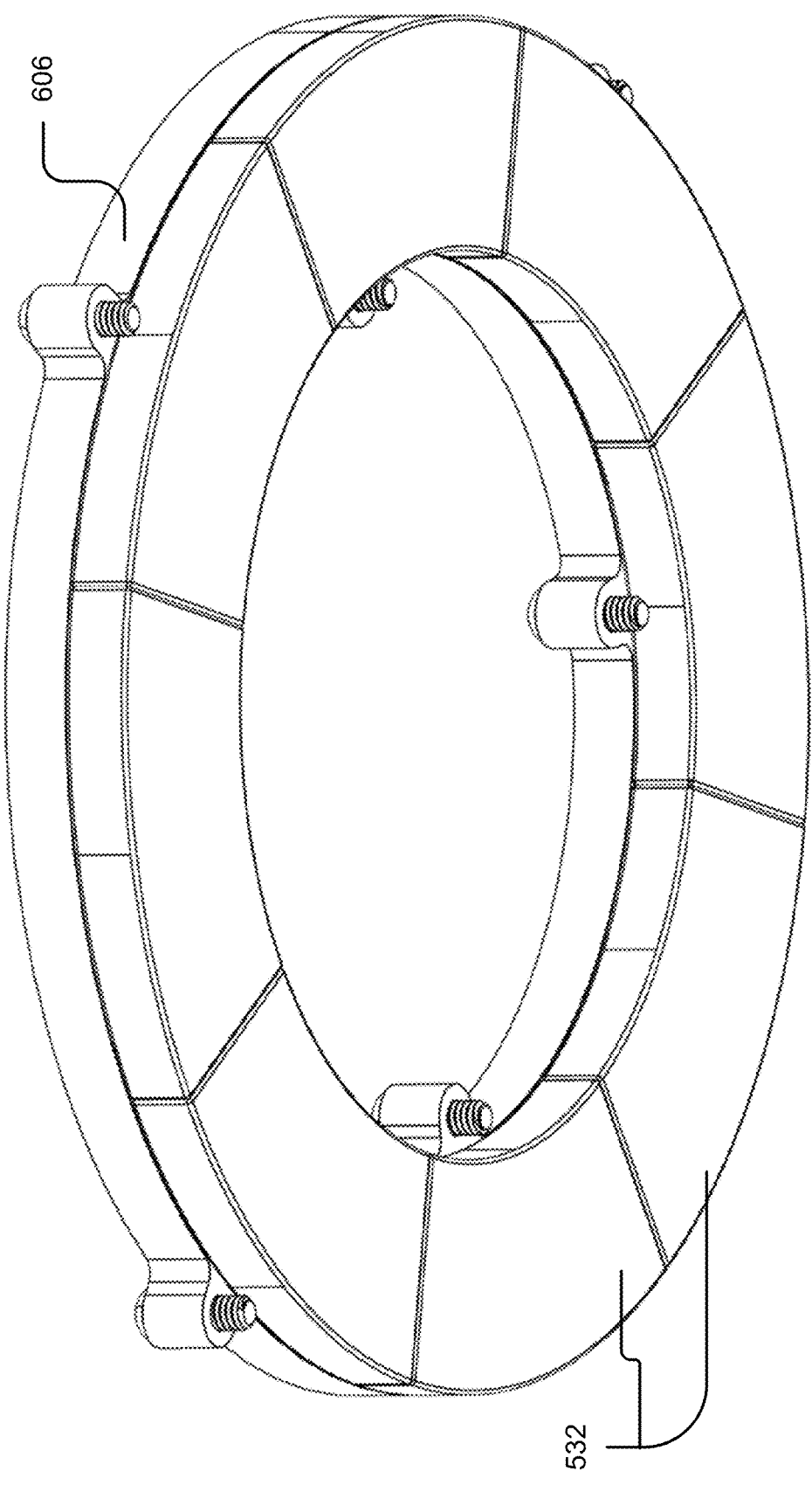
FIG. 6D illustrates a bottom view of example internal components of a magnetic lift member.

FIG. 6D illustrates a bottom view of example internal components of a magnetic lift member 152. As illustrated, the magnet holder 608 and upper bearing holder 604 have been omitted to show an example internal structure of the magnetic lift member 152. In the illustrated example, a magnetic lev backer 606 is shown coupled with a plurality of magnets 532. The magnets 532 may be glued to the mag lev backer 606 and/or held by a magnet holder 608, for example.

The mag lev backer 606 may be a strong ring (e.g., a steel ring), that holds the magnets 532. The ring may include bolt or other connection points that couple with an upper bearing holder 604, a magnet holder 608, and/or an enclosure 104 (e.g., the enclosure lid 128) as described and illustrated in the examples herein.

Bolts are illustrated extending through various components herein, such as in the mag lev backer 606. In some implementations, the bolts may be the same length as the bolt holes in which they are disposed, for example, to reduce gaps or other non-continuous structures, which may further cause inconsistencies with eddy currents, magnetic flux, or otherwise. For instance, the bolts may be trimmed to be the same size and length as the holes.

The magnets 532 may be wedge magnets disposed around the mag lev backer 606 with a flux pointing downward to maximize interaction with the flywheel 202. For example, as illustrated, the magnets 532 may be on a stationary component of the flywheel 202 instead of a rotating component because magnets may be constructed from weaker materials that may break under the stress of high rotational velocities. Additionally, by placing the magnets 532 on a stationary component, eddy currents and resulting forces may be reduced.

In some implementations, a top clamping plate 120a may be constructed from laminated cores of insulated sheets of metal, or made from a non-conductive material, to reduce eddy currents in the top clamping plate 120a, although other implementations are possible, as described elsewhere herein.

Figure 6E:
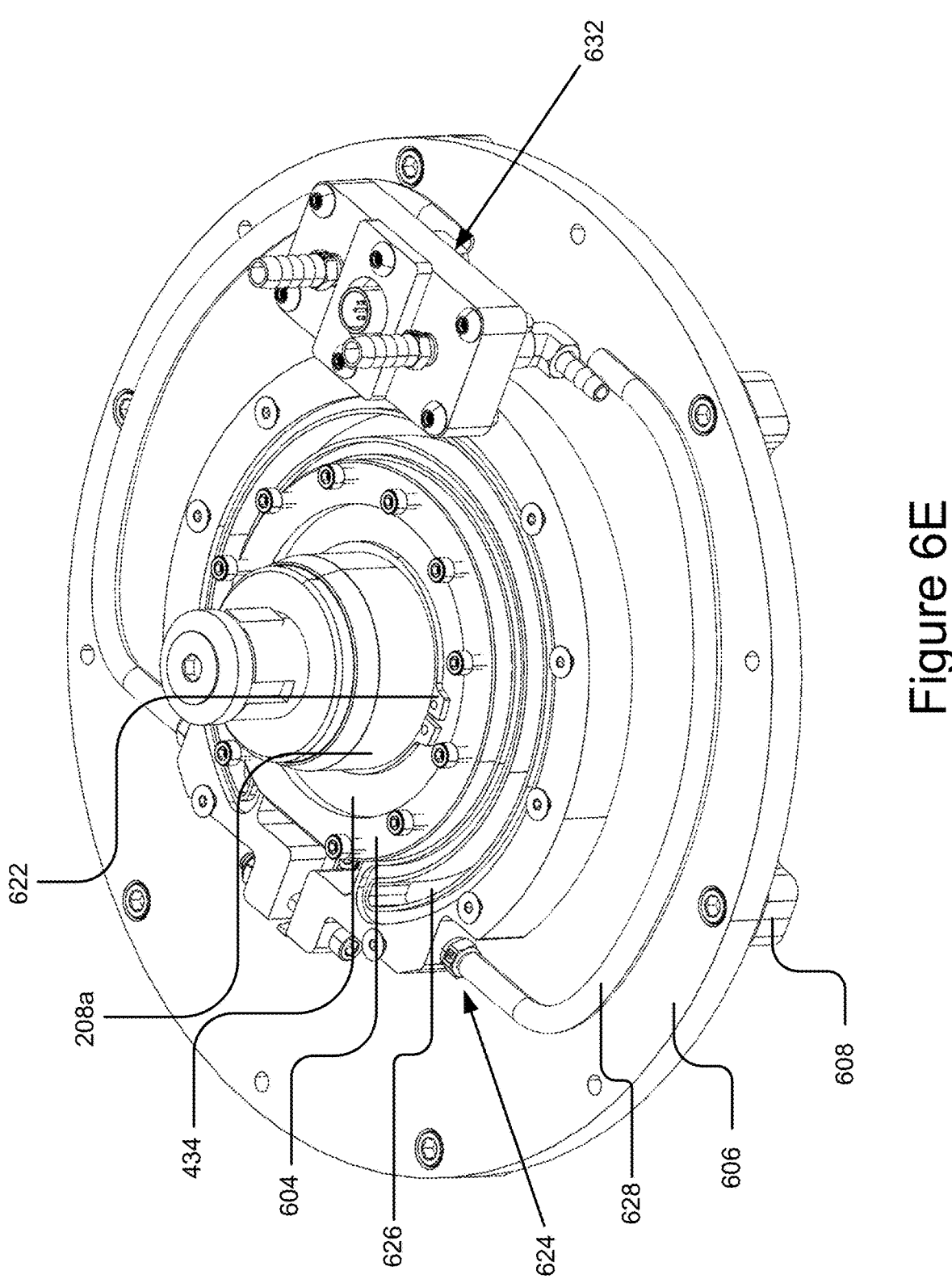
FIG. 6E illustrates a top-down view of an example magnetic lift member.

FIG. 6E illustrates a top-down view of another example magnetic lift member 152. In the depicted implementation, backer plate 606 and magnet holder 608 are shown. A bearing 434 held by an upper bearing holder 604 around an upper axle 208*a* is also shown. A retaining clip 622 is shown around the upper axle 208*a* is shown holding the bearing(s) 434 in place.

In the depicted example, a cooling assembly 624 is also shown around or integrated with the bearing holder 604. For instance, the cooling assembly 624 may have a chiller ring 626 that allows coolant to circulate around a bearing holder 604 or another component. The chiller ring 626 may be coupled with a coolant tube 628 that receives coolant, delivers it to the chiller ring 626, and removes it to a pump and/or radiator (not visible) external to these structures.

In the illustrated example, a connector assembly 632 or connector seal plate is also shown with barbed tube connectors and an electrical connection. The connector assembly 632 may receive pneumatic tubes for a vacuum assembly 108, pneumatic tubes for a chiller ring 626, an electrical connection for sensors, and/or other components. While the connector assembly 632 is illustrated floating above the magnetic lift member 108, it may be coupled or integrated with a lid 128 or various other components. Other components, such as support brackets, seals, motors, etc., are omitted from FIG. 6E for purposes of illustration.

Figure 7A:
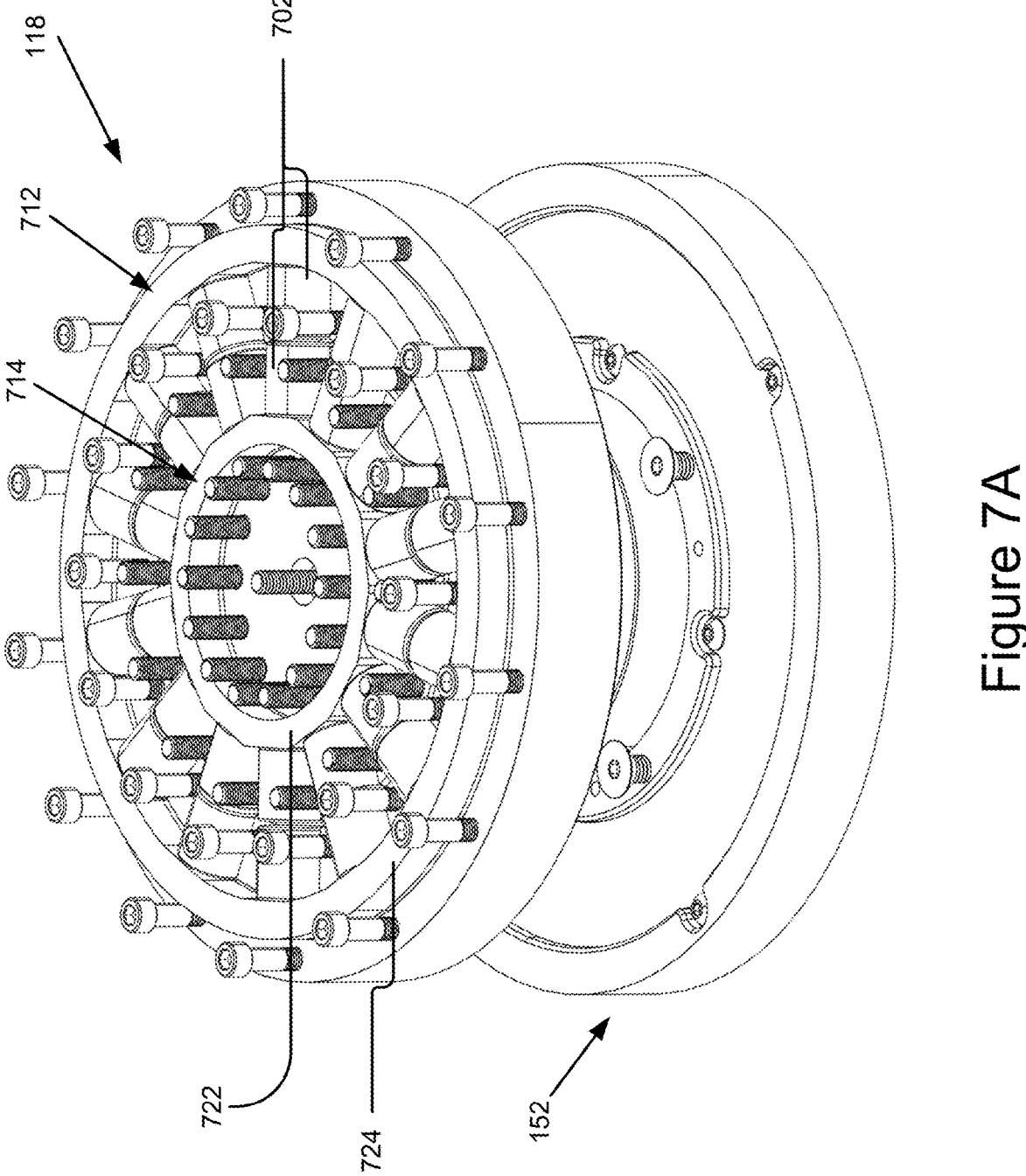
FIG. 7A illustrates an example magnetic coupling.
Figure 7B:
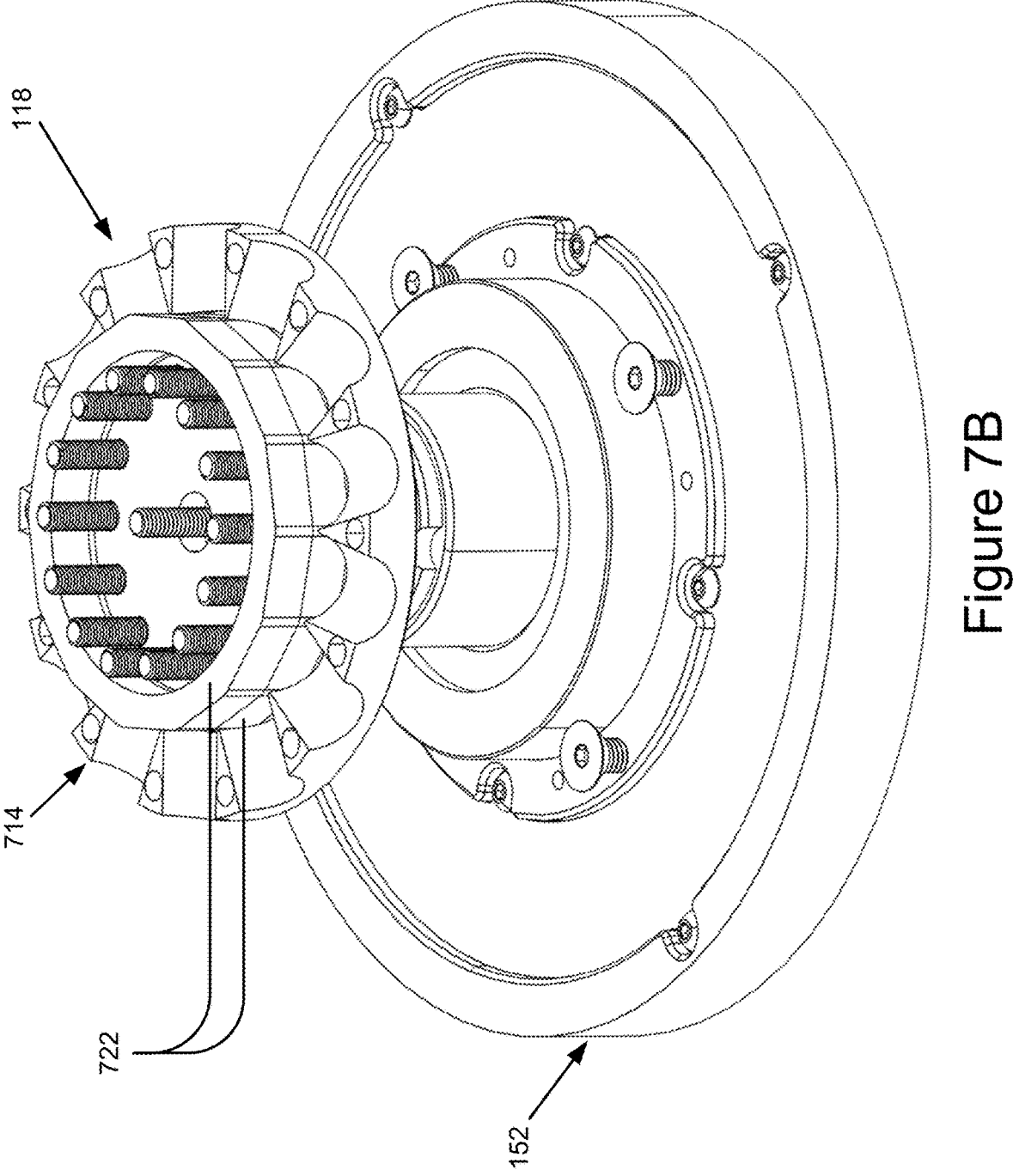
FIG. 7B illustrates an example magnetic coupling with an exterior rotor bottom and other components removed.

FIGS. 7A and 7B illustrate various views, components, and constructions of example flywheel-motor couplings, such as a magnetic coupling 118 that couples the motor-generator 110 to the flywheel 202. Although a magnetic coupling 118 is described, it should be noted that a physical, direct coupling, a clutch, a gear or gearbox, etc., may be used. As illustrated, the magnetic coupling 118 may be positioned at the end of a top (or bottom, in other implementations) axle 208 to interact with the flywheel 202.

The magnetic coupling 118 may allow mechanical interaction between the motor-generator 110 and the flywheel 202. For example, as described below, an inner rotor 714 (which may include the inner rotor 414 noted above) and outer rotor 712 (which may include one or more of the top outer rotor 412 and bottom outer rotor 410 noted above) may each include magnets 702 that interact with each other, to transfer force. The magnetic coupling 118 may provide a dampening effect between the motor 110 and flywheel 202 to avoid transfer of vibration or of jerk. For example, alternating magnets 702 may be used, which serve as gears using the shear effect of the magnets 702 and may have a dampening effect.

As noted above in reference to FIG. 6A, an example magnetic coupling 118 may be coupled with a top axle 208*a*, which passes through a magnetic lift member 152 and upper bearing housing 422, depending on the implementation. As illustrated, the magnetic coupling 118 may be located at the end of the top axle 208. The upper bearing O-ring housing 422 is also omitted from FIGS. 7A and 7B to show other components.

In some implementations, a magnetic coupling 118 may be assembled in a single unit that may be bolted to a motor mount (e.g., 406) and/or to a flywheel enclosure 104. Accordingly, it can be pre-assembled, and the manufacturing process can be improved for both safety and speed.

FIG. 7A illustrates an example magnetic coupling 118 with an exterior rotor top (e.g., 412 and top component 414) removed to expose the internal structure of the magnetic coupling 118. As illustrated in the example implementation, a series of magnets 702 may be disposed at an internal rotor 714 and an external rotor 712. Cylindrical magnets (e.g., N52 neodymium magnets) may be used and placed in the rotors 714 and/or 712, so that their poles alternate, although other implementations are possible. In some implementations, the magnets 702 may be rectangular or another shape or configuration. Similarly, although the rotors 714 and 712 are radially located from each other, they may be vertically (e.g., where the magnets of opposing rotors are located vertically instead of radially) or otherwise oriented.

The magnets 702 may create a shearing force against each other that serves to couple the rotors 712 and 714 together. For example, opposite magnets could be north and south oriented, so that they pull towards each other. In some implementations, where the magnets 702 are offset from each other, a shear force may be maximized to couple the two rotors 712 and 714 together.

In some implementations, a seal or membrane may be placed between the two rotors 712 and 714 to maintain the vacuum internal to the enclosure 104.

As illustrated, the magnetic coupling 118 may include a number of bolts coupling various portions together. For instance, one or more bolts may couple the internal rotor 714 bottom and/or internal rotor shunt 722 (e.g., coupled or integrated with the internal rotor 714) to another component, such as a motor-generator 110 or a top axle 208*a*. Similarly, other bolts may couple together external rotor shunt(s) 724 (e.g., coupled or integrated with the internal rotor 712), and other components. The bolts may be used to adjust the positioning of the magnetic coupling 118.

As illustrated, the magnetic coupling 118 may include an internal shunt 722 and an external shunt 724 or backer rings (e.g., a steel backer ring) that provide structure and support to the magnets 702, and/or they may improve magnetic flux. For instance, the shunts or rings may cause the magnetic flux to be more controlled and focused. In some instances, these components also increase the strength of the assembly.

In some instances, the shunts 722/724 or other devices or lips that hold the magnets 702 in the rotors 712/714 may be reinforced as the rotors may not only experience hundreds or thousands (e.g., 2500 pounds) of force due to the magnetic pull but may also experience significant centrifugal force while the flywheel 202 is spinning (e.g., at 12,500 RPM). In order to reduce radial forces on the magnets 702, they may be placed near to the axis of rotation, as illustrated.

Although not illustrated, in some implementations a motor-generator may be coupled with the internal rotor top (e.g., at 414). In other implementations, the motor-generator may be directly coupled with the top axle 208*a* or via other mechanisms, as noted elsewhere herein. In some instances, the motor-generator 110 may be a synchronous reluctance motor that may decouple/freewheel/coast.

FIG. 7B illustrates an example magnetic coupling 118 with an exterior rotor bottom 412 and other components removed to expose example internal rotor 714 components. As illustrated, multiple internal rotor shunts 722 may be located radially inward from the magnets 702 (not shown in FIG. 7B). In implementations where the magnets 702 are cylindrical, the internal rotor bottom 714 may include contours or other structures for holding the magnets 702 in place.

Although not shown, bar magnets 702 may be coupled with an internal rotor 714 and external rotor 712. As noted above, the magnetic coupling 118 may include shunts 722 or 724 that hold the magnets 702 and/or direct the magnetic field. In some implementations, an external rotor 712 body and/or internal rotor 714 body may each clamp over and/or around the magnets 702 to hold them in place. For instance, the internal rotor 714 body may include a lip that curves around a face of its magnets to hold them in place.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A system comprising:
a flywheel including a rotatable mass component and one or more axles coupled with the rotatable mass component, wherein the rotatable mass component includes:
a top plate with a flat top surface, the top plate rotating about an axis of rotation, the flat top surface positioned adjacent to one or more magnets of a magnetic lift component, the top plate being attracted to the one or more magnets to reduce a downward force of the flywheel on one or more bearings;
the magnetic lift component having the one or more magnets positioned around a center perforation, the one or more axles passing through the center perforation in the magnetic lift component, the one or more magnets pulling the flywheel toward the magnetic lift component;
a support structure coupled with the magnetic lift component, the support structure holding the magnetic lift component at a stationary location relative to the support structure; and
the one or more bearings coupled with the support structure and the one or more axles to maintain the one or more axles at the axis of rotation, wherein the one or more axles at the axis of rotation include a top axle and a bottom axle, the top axle being separate from the bottom axle, the top axle passing through the center perforation of the magnetic lift component.

2. The system of claim 1, wherein the rotatable mass component includes:
the top plate;
multiple plates stacked together; and
a bottom plate, the multiple plates being located between the top plate and the bottom plate.

3. The system of claim 2, wherein:
the top plate and the bottom plate are coupled together using a plurality of fasteners, the top plate and the bottom plate applying a compressive force on the multiple plates.

4. The system of claim 1, wherein the one or more bearings include:
one or more top bearings and one or more bottom bearings, the one or more top bearings interacting with a top of the flywheel at the one or more axles, and the one or more bottom bearings interacting with a bottom of the rotatable mass component at the one or more axles.

5. The system of claim 1, wherein the one or more magnets are configured to pull the flywheel with a force greater than a weight of the flywheel.

6. The system of claim 1, further comprising:
one or more seals that form an airtight seal between an inside and an outside of a flywheel enclosure, the support structure including the flywheel enclosure, the flywheel being located inside the flywheel enclosure.

7. The system of claim 1, wherein:
the support structure includes a lid, the rotatable mass component being located inside the support structure;
the one or more magnets are coupled to a bottom side of the lid; and
the one or more magnets are located inside the support structure.

8. The system of claim 7, wherein:
the support structure includes an enclosure that is sealed;
a vacuum assembly is coupled to the lid to establish an internal vacuum; and
the one or more magnets are located inside the internal vacuum.

9. The system of claim 1, wherein the magnetic lift component includes:
a backer ring coupled to the support structure;
the one or more magnets disposed on the backer ring; and
a magnet holder enclosing the one or more magnets and coupled with the backer ring.

10. The system of claim 1, further comprising:
a magnetic coupling having a first rotor and a second rotor, the first rotor including a first set of magnets, the second rotor including a second set of magnets, the first set of magnets and the second set of magnets interacting to rotationally couple the first rotor to the second rotor.

11. The system of claim 10, further comprising:
wherein the first rotor is located inside at least a portion of the second rotor, the first rotor being coupled with the one or more axles and the second rotor being coupled with an electric motor.

12. A mechanical-energy storage unit comprising:
a flywheel including a rotatable mass component and one or more axles coupled with the rotatable mass component, the rotatable mass component including:
a top clamping plate;
multiple plates;
a bottom clamping plate, the multiple plates being located between the top clamping plate and the bottom clamping plate; and
a plurality of fasteners coupling the top clamping plate with the bottom clamping plate and applying a compressive force on the multiple plates;
a magnetic lift component having one or more magnets positioned around a center perforation, the one or more axles passing through the center perforation in the magnetic lift component, the one or more magnets pulling the flywheel toward the magnetic lift component, the top clamping plate being positioned adjacent to the one or more magnets of the magnetic lift component;
a support structure coupled with the magnetic lift component, the support structure holding the magnetic lift component at a stationary location relative to the support structure, wherein:
the support structure includes a lid, the rotatable mass component being located inside the support structure;

the one or more magnets are coupled to a bottom side of the lid; and the one or more magnets are located inside the support structure; and one or more bearings coupled with the support structure and the one or more axles to maintain the one or more axles at an axis of rotation, the top clamping plate being attracted to the one or more magnets to reduce a downward force of the flywheel on the one or more bearings.

13. The mechanical-energy storage unit of claim 12, wherein the one or more magnets are configured to pull the flywheel with a force greater than a weight of the flywheel.

14. The mechanical-energy storage unit of claim 12, wherein the magnetic lift component includes:

a backer ring coupled to the support structure;

the one or more magnets disposed on the backer ring; and a magnet holder enclosing the one or more magnets and coupled with the backer ring.

15. A flywheel assembly comprising:

a magnetic lift component having one or more magnets positioned around a center perforation, one or more axles of a flywheel passing through the center perforation in the magnetic lift component, the one or more magnets pulling the flywheel toward the magnetic lift component, the magnetic lift component being held by a support structure, wherein the magnetic lift component includes:

a backer ring coupled to the support structure;

the one or more magnets disposed on the backer ring; and a magnet holder coupled with the backer ring and providing support to the one or more magnets.

16. The flywheel assembly of claim 15, wherein the one or more magnets are configured to pull the flywheel with a force greater than a weight of the flywheel.

17. The flywheel assembly of claim 15, wherein:

the support structure includes an enclosure with a lid, the flywheel being located inside the enclosure;

the one or more magnets are coupled to a bottom side of the lid; and the one or more magnets are located inside the enclosure.

18. A system comprising:

a flywheel including a rotatable mass component and one or more axles coupled with the rotatable mass component, wherein the rotatable mass component includes:

a top plate with a flat top surface, the top plate rotating about an axis of rotation, the flat top surface positioned adjacent to one or more magnets of a magnetic lift component, the top plate being attracted to the one or more magnets to reduce a downward force of the flywheel on one or more bearings;

the magnetic lift component having the one or more magnets positioned around a center perforation, the one or more axles passing through the center perforation in the magnetic lift component, the one or more magnets pulling the flywheel toward the magnetic lift component;

a support structure coupled with the magnetic lift component, the support structure holding the magnetic lift component at a stationary location relative to the support structure;

the one or more bearings coupled with the support structure and the one or more axles to maintain the one or more axles at the axis of rotation; and one or more seals that form an airtight seal between an inside and an outside of a flywheel enclosure, the support structure including the flywheel enclosure, the flywheel being located inside the flywheel enclosure.

* * * * *